United States Patent
Regev et al.

(10) Patent No.: US 12,537,655 B2
(45) Date of Patent: Jan. 27, 2026

(54) MEASUREMENT INFORMATION FOR SPUR ESTIMATION AND CORRECTION

(71) Applicant: QUALCOMM Incorporated, San Diego, CA (US)

(72) Inventors: Aviv Regev, Tel Aviv (IL); Ronen Shaked, Kfar Saba (IL); Yaniv Eistein, Tel Aviv (IL); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 18/359,185

(22) Filed: Jul. 26, 2023

(65) Prior Publication Data
US 2025/0038933 A1  Jan. 30, 2025

(51) Int. Cl.
*H04L 5/00* (2006.01)
*H04W 28/02* (2009.01)

(52) U.S. Cl.
CPC ....... *H04L 5/0073* (2013.01); *H04W 28/0215* (2013.01)

(58) Field of Classification Search
None
See application file for complete search history.

(56) References Cited

U.S. PATENT DOCUMENTS

| | | | | |
|---|---|---|---|---|
| 4,879,758 A | * | 11/1989 | DeLuca | H04W 88/022 455/317 |
| 2003/0068995 A1 | * | 4/2003 | Louis | H04B 1/109 455/313 |
| 2012/0082043 A1 | * | 4/2012 | Hwang | H04W 24/10 370/252 |
| 2012/0282875 A1 | * | 11/2012 | Park | H04W 4/90 455/404.1 |
| 2013/0034127 A1 | * | 2/2013 | Subburaj | G01S 19/21 375/E1.02 |
| 2013/0114583 A1 | * | 5/2013 | Park | H04W 52/0216 370/338 |
| 2014/0119296 A1 | * | 5/2014 | Akutagawa | H04B 1/0475 370/329 |

(Continued)

*Primary Examiner* — Lonnie V Sweet
(74) *Attorney, Agent, or Firm* — Kevin M. Donnelly; Holland & Hart LLP

(57) ABSTRACT

A first wireless communication device receives spur measurement information associated with one or more frequency domain spurs in a transmission signal spectrum of a second wireless communication device. The spur measurement information indicates a baseband frequency and an expected power of each of the one or more frequency domain spurs. The first wireless communication device receives one or more signals from the second wireless communication device and processes the one or more signals in accordance with the spur measurement information to compensate the one or more signals for the one or more frequency domain spurs in the transmission signal spectrum of the second wireless communication device. In some implementations, the first wireless communication device receives the spur measurement information in association with transmitting spur suppression capability information that indicates a capability of the first wireless device to estimate and correct frequency domain spurs.

30 Claims, 13 Drawing Sheets

(56) References Cited

U.S. PATENT DOCUMENTS

| | | | | |
|---|---|---|---|---|
| 2014/0197875 A1* | 7/2014 | Potty | ............ | H04B 15/04 |
| | | | | 327/360 |
| 2014/0355459 A1* | 12/2014 | Rafique | ............ | H04W 24/06 |
| | | | | 370/252 |
| 2016/0182271 A1* | 6/2016 | Chance | ............ | H04B 1/28 |
| | | | | 375/344 |
| 2017/0041804 A1* | 2/2017 | Goedken | ............ | H04W 52/243 |
| 2017/0347273 A1* | 11/2017 | Goedken | ............ | H04W 52/52 |
| 2018/0254852 A1* | 9/2018 | Avivi | ............ | H04L 1/0033 |
| 2018/0269892 A1* | 9/2018 | Kurose | ............ | H04B 1/40 |
| 2019/0109606 A1* | 4/2019 | Delos | ............ | H04B 1/0475 |
| 2021/0399779 A1* | 12/2021 | Raghavan | ............ | H04B 7/06954 |

* cited by examiner

MEASUREMENT INFORMATION FOR SPUR ESTIMATION AND CORRECTION

TECHNICAL FIELD

The following relates to wireless communication, including measurement information for spur estimation and correction.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communication system may include one or more base stations, each supporting wireless communication for communication devices, which may be known as user equipment (UE).

In some wireless communication systems, a wireless communication device (such as a UE or a network entity) may experience a radio frequency (RF) impairment known as a spur. Spurs can cause interference and degrade the overall performance of a wireless communication system. In some cases, a wireless communication device can mitigate or otherwise reduce the adverse effects of a spur by performing measurements of received signals and using the measurements to compensate for spurs present in the received signals. However, the level of accuracy attained using such techniques may not be suitable for modulation and coding schemes (MCS) with relatively high signal to noise ratio (SNR) constraints.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless communication device. The first wireless communication device includes a processing system which includes processor circuitry and memory circuitry that stores code. The processing system is configured to cause the first wireless communication device to receive spur measurement information associated with one or more frequency domain spurs in a transmission signal spectrum of a second wireless communication device, the spur measurement information indicating a baseband frequency and an expected power of each of the one or more frequency domain spurs. The processing system is further configured to cause the first wireless communication device to receive and process one or more signals in accordance with the spur measurement information to compensate the one or more signals for the one or more frequency domain spurs in the transmission signal spectrum of the second wireless communication device.

Another innovative aspect of the subject matter described in this disclosure can be implemented in a second wireless communication device. The second wireless communication device includes a processing system which includes processor circuitry and memory circuitry that stores code. The processing system is configured to cause the second wireless communication device to receive spur suppression capability information associated with a first wireless communication device, the spur suppression capability information indicating a capability of a first wireless device to estimate and correct frequency domain spurs. The processing system is further configured to cause the second wireless communication device to transmit, in accordance with the spur suppression capability information, spur measurement information associated with one or more frequency domain spurs in a transmission signal spectrum of the second wireless communication device, the spur measurement information indicating a baseband frequency and an expected power of each of the one or more frequency domain spurs.

Another innovative aspect of the subject matter described in this disclosure can be implemented in a method for wireless communication by a first wireless communication device. The method includes receiving spur measurement information associated with one or more frequency domain spurs in a transmission signal spectrum of a second wireless communication device, the spur measurement information indicating a baseband frequency and an expected power of each of the one or more frequency domain spurs. The method further includes receiving and processing one or more signals in accordance with the spur measurement information to compensate the one or more signals for the one or more frequency domain spurs in the transmission signal spectrum of the second wireless communication device.

Another innovative aspect of the subject matter described in this disclosure can be implemented in a method for wireless communication by a second wireless communication device. The method includes receiving spur suppression capability information associated with a first wireless communication device, the spur suppression capability information indicating a capability of a first wireless device to estimate and correct frequency domain spurs. The method further includes transmitting, in accordance with the spur suppression capability information, spur measurement information associated with one or more frequency domain spurs in a transmission signal spectrum of the second wireless communication device, the spur measurement information indicating a baseband frequency and an expected power of each of the one or more frequency domain spurs.

In some implementations, to process the one or more signals, the processing system of the first wireless communication device may be configured to cause the first wireless communication device to use a linear minimum mean-square error (LMMSE) estimator to compensate the one or more signals for the one or more frequency domain spurs in the transmission signal spectrum of the second wireless communication device.

In some implementations, the processing system of the second wireless communication device may be configured to cause the second wireless communication device to transmit, in accordance with the spur measurement information, one or more signals using a modulation and coding scheme (MCS) that includes one or more of a 256 quadrature amplitude modulation (QAM) scheme, a 1K QAM scheme, a 4K QAM scheme, or a 16K QAM scheme.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

Figure 1:
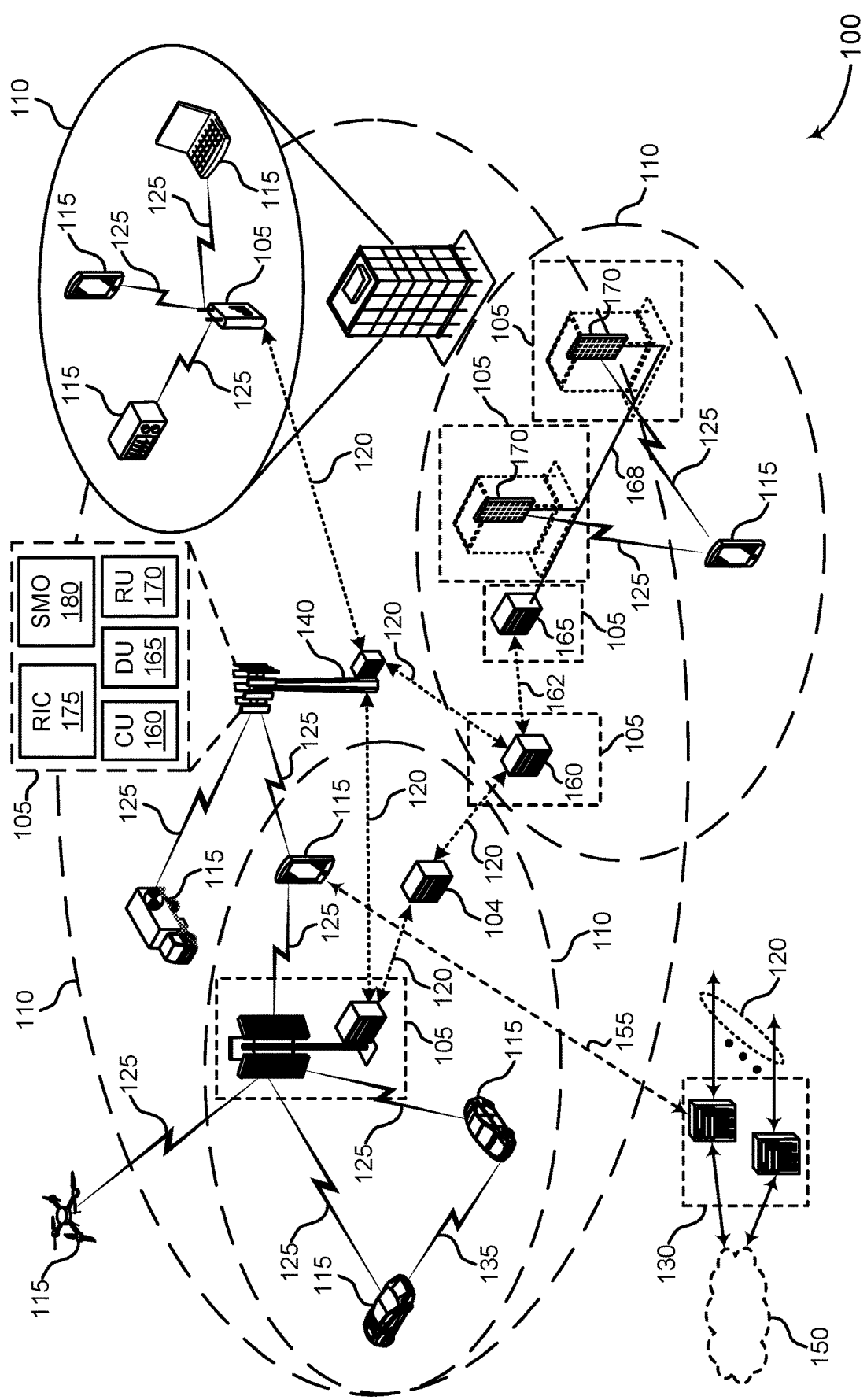
FIGS. 1 and 2 show pictorial diagrams of example wireless communication systems that support measurement information for spur estimation and correction according to some implementations.

The following description is directed to particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

In some wireless communication systems, a wireless communication device (such as a user equipment (UE) or a network entity) may experience an RF impairment known as a spur, which is an undesired signal in the transmission frequency spectrum of a wireless communication device. A spur (equivalently referred to as a frequency domain spur or a spur signal) may correspond to a spike in a noise signal spectrum of a wireless communication device. Spurs can be caused by various factors, including (but not limited to) filtering errors, non-linear analog digital converter (ADC) behavior, and signal distortion, among other examples. Spurs can cause interference and degrade the overall performance of a wireless communication system. In some cases, a wireless communication device can mitigate or otherwise reduce the adverse effects of a spur by performing measurements of received signals and using the measurements to compensate for spurs present in the received signals. However, the level of accuracy attained using such techniques may not be suitable for modulation and coding schemes (MCS) with relatively high signal to noise ratio (SNR) constraints.

Various aspects generally relate to spur mitigation, and more specifically, to a first wireless communication device using spur measurement information provided by a second wireless device to compensate for spurs associated with transmissions by the second wireless device. The spur measurement information provided by the second wireless communication device may include an expected power and a baseband frequency of one or more spurs in a transmission signal spectrum of the second wireless communication device. The first wireless communication may use the spur measurement information to estimate and correct the one or more spurs, for example, using a linear minimum mean square error (LMMSE) estimator, in association with communicating with the second wireless communication device. In some implementations, the first wireless communication device may transmit spur suppression capability information to the second wireless communication device. The spur suppression capability information may indicate a capability of the first wireless communication device to estimate and correct spurs. The second wireless communication device may transmit the spur measurement information to the first wireless communication device in accordance with the spur suppression capability information provided by the first wireless communication device.

Particular aspects of the subject matter described in this disclosure can be implemented to realize one or more of the following potential advantages. The first wireless communication device may use the expected power and the baseband frequency of the one or more spurs to estimate and correct for the one or more spurs using LMMSE estimation techniques, which are more accurate than conventional least squares (LS) estimation techniques. Estimating and correcting the one or more spurs with better accuracy may enable the first wireless communication device to support some relatively high-order modulation schemes with relatively high SNR constraints (such as 4K quadrature amplitude modulation (QAM) or 16K QAM) when communicating with the second wireless communication device. Supporting these relatively high-order modulation schemes may increase throughput, reduce signaling overhead, and provide for better power management and spectral efficiency in communications between the first wireless communication device and the second wireless communication device.

FIG. 1 shows an example of a wireless communication system 100 that supports measurement information for spur estimation and correction according to some implementations. The wireless communication system 100 may include one or more network entities 105, one or more UEs 115, and a core network 130. In some implementations, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

A node of the wireless communication system 100, which may be referred to as a network node, or a wireless node, may be a network entity 105 (for example, any network entity described herein), a UE 115 (for example, any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system may include disclosure of the UE 115, network entity 105, apparatus, device, or computing system being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (for example, in accordance with an S1, N2, N3, or other interface protocol). In some implementations, network entities 105 may communicate with one another via a backhaul communication link 120 (for example, in accordance with an X2, Xn, or other interface protocol) either directly (for example, directly between network entities 105) or indirectly (for example, via a core network 130). In some implementations, network entities 105 may communicate with one another via at least one of a midhaul communication link 162 (for example, in accordance with a midhaul interface protocol) or a fronthaul communication link 168 (for example, in accordance with a fronthaul interface protocol). The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some implementations, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), or a Service Management and Orchestration (SMO) 180 system. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some implementations, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some implementations, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some implementations, a midhaul communication link 162 or a fronthaul communication link 168 may be implemented in accordance with an interface (for example, a channel) between layers of a protocol stack supported by respective network entities 105 that are in communication via such communication links.

In wireless communication systems (for example, wireless communication system 100), infrastructure and spectral resources for radio access may support wireless backhaul link capabilities to supplement wired backhaul connections, providing an IAB network architecture (for example, to a core network 130). In some implementations, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120).

IAB nodes 104 may include an IAB mobile termination (IAB-MT) controlled (for example, scheduled) by DUs 165 of a coupled IAB donor. An IAB-MT may include an independent set of antennas for relay of communications with UEs 115, or may share the same antennas (for example, of an RU 170) of an IAB node 104 used for access via the DU 165 of the IAB node 104 (for example, referred to as virtual IAB-MT (vIAB-MT)). In some implementations, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support measurement information for spur estimation and correction. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1. The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling.

The wireless communication system 100 may support communication with a UE 115 using carrier aggregation or multi-carrier operation.

A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," referring to a network entity 105, may refer to any portion of a network entity 105 (for example, a base station 140, a CU 160, a DU 165, a RU 170) of a RAN communicating with another device (for example, directly or via one or more other network entities 105).

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communications resource may refer to a combination of an RF spectrum resource, a time resource, and a spatial resource (for example, a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communication systems, a slot may further be divided into multiple mini slots associated with one or more symbols. Excluding the cyclic prefix, each symbol period may be associated with one or more (for example, $N_f$)

sampling periods. The duration of a symbol period may depend on the subcarrier spacing or frequency band of operation.

A subframe, a slot, a mini-slot, or a symbol may be the smallest scheduling unit (for example, in the time domain) of the wireless communication system 100 and may be referred to as a transmission time interval (TTI). In some implementations, the TTI duration (for example, a quantity of symbol periods in a TTI) may be variable. Additionally, or alternatively, the smallest scheduling unit of the wireless communication system 100 may be dynamically selected (for example, in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (for example, a base station 140, an RU 170) may be movable and provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communication system 100 may include, for example, a heterogeneous network in which different types of the network entities 105 provide coverage for various coverage areas 110 using the same or different radio access technologies.

The wireless communication system 100 may be configured to support ultra-reliable communications or low-latency communications, or various combinations thereof. For example, the wireless communication system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (for example, in accordance with a peer-to-peer (P2P), D2D, or sidelink protocol). In some implementations, one or more UEs 115 of a group that are performing D2D communications may be within the coverage area 110 of a network entity 105 (for example, a base station 140, an RU 170), which may support aspects of such D2D communications being configured by (for example, scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communication system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (for example, less than 100 kilometers) relative to communications using the smaller frequencies and longer waves of the high frequency (HF) or very high frequency (VHF) portion of the spectrum below 300 MHz.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be associated with a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

According to some implementations, a UE 115 may receive spur measurement information (such as the spur measurement information 210 shown and described with reference to FIG. 2) associated with one or more spurs in a noise signal spectrum of a network entity 105. The spur measurement information may indicate a baseband frequency and an expected power of each of the one or more frequency domain spurs. The UE 115 may receive a pilot signal (such as the pilot signal 220 shown and described with reference to FIG. 2) from the network entity 105 and process the pilot signal in accordance with the spur measurement information to compensate for the one or more spurs. In some implementations, the UE 115 may receive the spur measurement information in association with transmitting spur suppression capability information (such as the spur suppression capability information 205 shown and described with reference to FIG. 2) that indicates a capability of the UE 115 to estimate and correct spurs.

Figure 2:
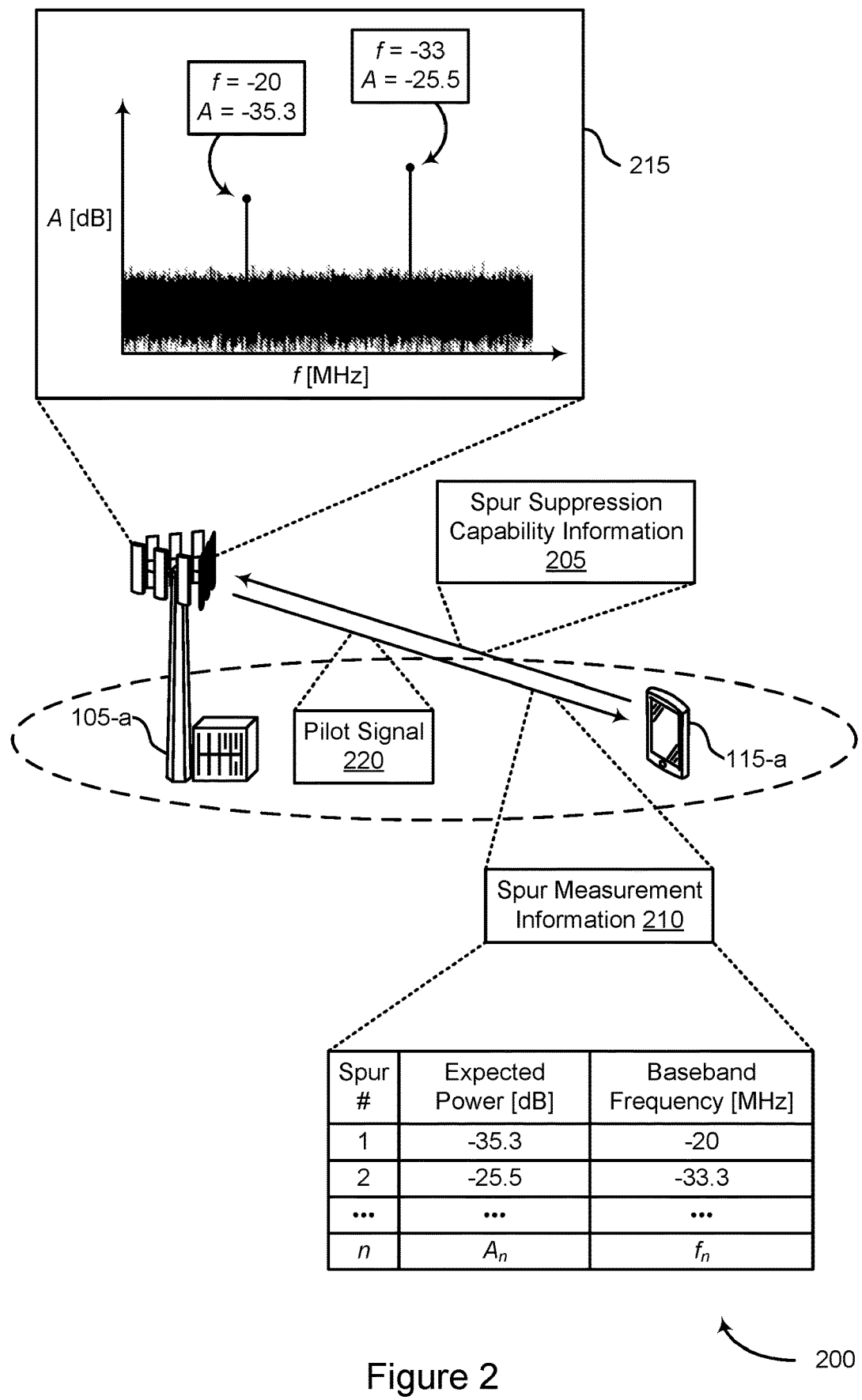

FIG. 2 shows an example wireless communication system 200 that supports measurement information for spur estimation and correction according to some implementations. The wireless communication system 200 includes a network entity 105-a, which may be an example of one or more aspects of the network entities 105 shown and described with reference to FIG. 2. Likewise, the wireless communication system 200 includes a UE 115-a, which may be an example of one or more aspects of the UEs 115 shown and described with reference to FIG. 1. In the example of FIG. 2, the UE 115-a may perform downlink spur estimation and correction using spur measurement information 210 provided by the network entity 105-a. In some other implementations, the network entity 105-a may use spur measurement information provided by the UE 115-a to perform uplink spur estimation and correction.

A spur (also referred to as a spur signal, a Tx spur, or a frequency domain spur) is an RF impairment that causes spikes in the noise spectrum of a wireless communication device. gNBs (such as the network entity 105-a) can calibrate spurs to enable downlink reception for modulation schemes such as 256 QAM or 1K QAM. However, there may be higher SNR constraints for demodulating constellations of higher-order QAM modulations such as 4K QAM or 16K QAM. Interference caused by spurs may create a noise floor at the frequencies that are not filtered/corrected.

In some cases, the UE 115-a can detect or otherwise estimate the frequencies of spurs (for example, by performing measurements of signals received from the network entity 105-a), but this process can be time consuming, resource intensive, and relatively inaccurate. If, however, the network entity 105-a informs the UE 115-a of the spur frequencies (for example, via a downlink channel), the UE 115-a can perform spur suppression/mitigation with reduced latency, higher accuracy, and greater processing efficiency. Furthermore, even if the UE 115-a is able to detect or otherwise estimate the spur frequencies, the UE 115-a may have to use LS estimation to cancel the spurs because the UE 115-a may be unable to accurately determine the power of the spurs.

Some implementations of the subject matter described in this disclosure provide for using LMMSE to perform spur suppression/cancellation at the UE 115-a. For example, the network entity 105-a may inform the UE 115-a of the average power of each spur in a transmission signal spectrum 215 of the network entity 105-a. With this information, the UE 115-a can use LMMSE to cancel/correct the spurs with greater accuracy. The network entity 105-a may signal both the expected power and baseband frequency of each spur such that the UE 115-a can more effectively estimate and subtract/filter spurs from signals transmitted by the network entity 105-a.

Using LMMSE for spur mitigation may enable the UE 115-a to effectively reduce the power of each spur such that the spurs do not limit the noise floor of frequencies in which the spurs are present. As a result, the UE 115-a may be able to demodulate high order QAM constellations in frequencies that contain spurs. In the example of FIG. 2, the network entity 105-a may transmit spur measurement information 210 via a physical downlink control channel (PDCCH), a physical downlink shared channel (PDSCH), or any suitable downlink channel. In some implementations, the network entity 105-a may signal the spur measurement information 210 via downlink control information (DCI), RRC signaling, a MAC-CE, a or any suitable downlink message.

The spur measurement information 210 may include a spur list containing the frequency ($f_{spur}$) and associated average power ($A_{spur}$) of each spur in the transmission signal spectrum 215 of the network entity 105-a. The UE 115-a may receive the spur measurement information 210 and run (for each spur) a spur estimation and correction process using the average spur power(s) indicated by the network entity 105-a. For example, the UE 115-a may receive one or more signals from the network entity 105-a and use LMMSE to compensate or otherwise suppress the spurs in accordance with the spur measurement information 210.

In some implementations, the network entity 105-a may not have to perform real-time measurements to acquire the spur measurement information 210. For example, the spur power(s) can be measured offline as a part of a factory calibration process, before the network entity 105-a is deployed. The spur measurements may be performed using lab equipment such as a spectrum analyzer, which can produce a power spectrum density (PSD) graph of the transmission signal spectrum 215 associated with the network entity 105-a. An example PSD graph of the transmission signal spectrum 215 is depicted in the example of FIG. 2.

The network entity 105-a may compile the frequencies and powers of each Tx spur. For example, the network entity 105-a may compile the following list for the two spurs shown in the example of FIG. 2:

TABLE 1

Contents of Spur Measurement Information

| Spur Number | Spur Expected Power [dB] | Spur Baseband Frequency [MHz] |
| --- | --- | --- |
| 1 | A = −35.3 | $f_{spur}$ = −20 |
| 2 | A = −25.5 | $f_{spur}$ = −33.3 |

Spur estimation and correction at the UE 115-a (for example, the receiver) may benefit from the spur measurement information 210 signaled by the network entity 105-a (for example, the transmitter). The frequency domain representation of a pilot signal 220 received from the network entity 105-a may be represented according to Equation 1 below:

$$Y_m = H_m(X_m + \text{Spur}_m) + N_m$$

in which Y refers to the received pilot signal 220 (in the frequency domain), m refers to the subcarrier index of the pilot signal 220, H refers to the channel over which the pilot signal 220 is received, and N refers to the additive white Gaussian noise (AWGN) present in the channel. The UE 115-a may generate or otherwise calculate $Z_m$ (an equalized frequency domain representation) by subtracting the pilot signal 220 from the equalized signal according to Equation 2 below:

$$Z_m = eq(y_m) - X_m = (X_m + \text{Spur}_m + Err_m) - X_m = \text{Spur}_m + Err_m$$

in which eq($y_m$) is the LMMSE equalization of $y_m$ (the frequency domain representation of the pilot signal 220) and $Err_m$ captures both the LMMSE estimation error and the output thermal noise. The time domain representation of the equalized signal ($z_n$) is calculated according to Equation 3 below:

$$z_n = \text{spur}_n + err_n$$

in which n is the time domain sample index of the equalized signal. The time domain representation of the spur model is calculated according to Equation 4 below:

$$\text{spur}_n = Ce^{-j2\pi \frac{f_{spur}}{f_{samp}} n} \rightarrow z_n = Ce^{-j2\pi \frac{f_{spur}}{f_{samp}} n} + err_n$$

in which E ($|C|^2$)=A/Nfft, A refers to the average or expected spur power level of Table 1, and E($|err_n|^2$)=E $[|N_m \cdot /H|^2$, $f_{spur}$ refers to a frequency of the spur, and $f_{samp}$ refers to a sampling frequency. The LMMSE estimation of the instantaneous complex amplitude of the spur (including gain and phase), using $z_n$ and the spur average power A, is calculated according to Equation 5 below:

$$\hat{C}_{LMMSE} = \frac{A}{A + E(|err|^2)} \cdot \frac{1}{Nfft} \sum_{n=1}^{Nfft} e^{j2\pi \frac{f_{spur}}{f_{samp}} n} z(n)$$

The LS estimation of the spur's complex gain (without knowing A) is calculated according to Equation 6 below:

$$\hat{C}_{LS} = \frac{1}{Nfft} \sum_{n=1}^{Nfft} e^{j2\pi \frac{f_{spur}}{f_{samp}} n} z(n)$$

The LMMSE estimator is a function of the spur average power A and the spur frequency $f_{spur}$, while the LS estimator is only a function of the spur frequency $f_{spur}$. The UE 115-a may be unable to use LMMSE estimation without the average spur power A. Once spur estimation is complete, the Rx signal correction is calculated according to Equations 7 and 8 below:

$$\overline{Y}_m = Y_m - H_m \cdot \widehat{spur}_m$$
$$\widehat{spur}_n = \hat{C} e^{j2\pi \frac{f_{spur}}{f_{samp}} n}$$

In some implementations, the spur subcarriers may be calculated according to Equation 9 below:

$$fft(\text{spur}) = fft\left(Ce^{-j2\pi \frac{f_{spur}}{f_{samp}} n}\right) =$$
$$\sum_{n=0}^{Nfft-1} Ce^{-j2\pi \frac{f_{spur}}{f_{samp}} n} e^{-j2\pi \frac{m}{nfft} n} = \sum_{n=0}^{Nfft-1} Ce^{-j2\pi \left(\frac{f_{spur}}{f_{samp}} + \frac{m}{nfft}\right)}$$

in which the maximum power of the spur occurs when the term $$\left(\frac{f_{spur}}{f_{samp}} + \frac{m}{nfft}\right)$$

is an integer, as the fft(spur) term becomes a sum of ones.

The network entity 105-a may improve spur cancellation at the UE 115-a by providing spur measurement information 210 to the UE 115-a. For implementations in which no correction is applied, a spur can limit the noise floor at the frequencies in which the spur is present. With the spur measurement information 210 supplied by the network entity 105-a, the UE 115-a can more effectively mitigate spur impairments, such that the UE 115-a can demodulate QAM constellations up to 16K QAM and beyond.

The LMMSE estimator, which leverages the spur measurement information 210 provided by the network entity 105-a, may enable the UE 115-a to attain a higher SINR (relative to an LS estimator). Furthermore, unlike other LS estimators (which, for some SNRs, may even degrade performance relative to applying no correction), using an LMMSE estimator may consistently provide performance improvements relative to applying no correction.

Although some aspects of the wireless communication system 200 are described in the context of downlink operations (in which the UE 115-a compensates for spurs present in signals received from the network entity 105-a), the subject matter described in this disclosure is also applicable to uplink operations. For example, the network entity 105-a may use spur measurement information provided by the UE 115-a to compensate for spurs in a noise signal spectrum of the UE 115-a. In such implementations, the UE 115-a may transmit the spur measurement information to the network entity 105-a via a physical uplink control channel (PUCCH), a physical uplink shared channel (PUSCH), or any suitable uplink channel. The UE 115-a may include the spur measurement information in uplink control information (UCI), RRC signaling, a MAC-CE, or the like.

Figure 3:
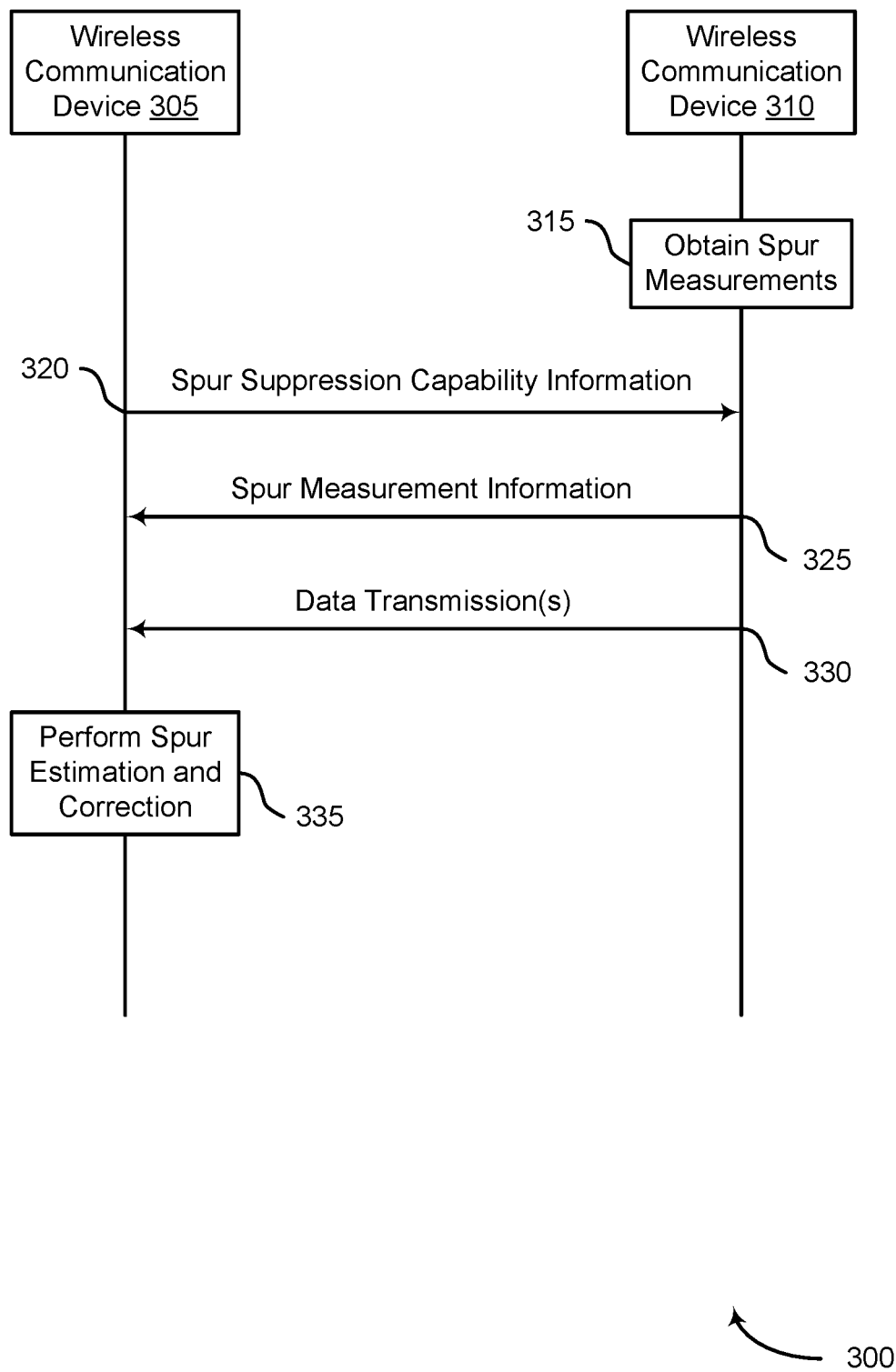
FIG. 3 shows an example sequence diagram that supports measurement information for spur estimation and correction according to some implementations.

FIG. 3 shows an example sequence diagram 300 that supports measurement information for spur estimation and correction according to some implementations. Operations of the sequence diagram 300 may be performed by a wireless communication device 305 (such as a first wireless communication device) and a wireless communication device 310 (such as a second wireless communication device). The wireless communication device 305 may be any suitable wireless communication device including, for example, the UE 115-a shown and described with reference to FIG. 2. Likewise, the wireless communication device 310 may be any suitable wireless communication device including, for example, the network entity 105-a shown and described with reference to FIG. 2. In the example of FIG. 3, the wireless communication device 305 may use spur measurement information provided by the wireless communication device 310 to estimate and correct one or more frequency domain spurs.

At 315, the wireless communication device 310 may obtain measurements of one or more frequency domain spurs in the transmission signal spectrum of the wireless communication device 310 (such as the transmission signal spectrum 215 shown and described with reference to FIG. 2). In some implementations, the measurements of the one or more frequency domain spurs may include offline measurements that are performed as a part of a factory calibration process. The measurements may include baseband frequency measurements (in MHz) and average power measurements (in dB) of the one or more frequency domain spurs in the transmission signal spectrum of the wireless communication device 310.

At 320, the wireless communication device 305 may transmit spur suppression capability information (such as the spur suppression capability information 205 shown and described with reference to FIG. 2) to the wireless communication device 310. The spur suppression capability information may indicate, for example, a capability of the wireless communication device 305 to estimate and correct frequency domain spurs. In some implementations, the wireless communication device may provide the spur suppression capability information to the wireless communication device 310 via RRC signaling, UCI, DCI, or a MAC-CE.

At 325, the wireless communication device 310 may transmit spur measurement information (such as the spur measurement information 210 shown and described with reference to FIG. 2) to the wireless communication device 305 in accordance with the spur suppression capability information provided by the wireless communication device 305. The spur measurement information may be associated with the one or more frequency domain spurs in the transmission signal spectrum of the wireless communication device 310. In particular, the spur measurement information may indicate a baseband frequency and an expected power of each of the one or more frequency domain spurs.

At 330, the wireless communication device 305 may receive one or more data transmissions from the wireless communication device 310. At 335, the wireless communication device 305 may use the spur measurement information provided by the wireless communication device 310 to perform spur estimation and correction on the one or more data transmissions. For example, the wireless communication device 305 may process the one or more signals in accordance with the spur measurement information to compensate for the one or more frequency domain spurs present in the one or more signals from the wireless communication device 310. The wireless communication device 305 may receive the one or more signals via a PDCCH, a PDSCH, a PUCCH, a PUSCH, or any suitable wireless channel between the wireless communication device 305 and the wireless communication device 310.

In some implementations, to process the one or more signals, the wireless communication device 305 may use an LMMSE estimator to filter or otherwise correct the one or more frequency domain spurs. The LMMSE estimator may be a function of the expected power and baseband frequency of the one or more frequency domain spurs. In other words, the baseband frequency and expected power of the one or more frequency domain spurs may be inputs to the LMMSE estimator. For example, the wireless communication device 305 may use the baseband frequency and the expected power of each of the one or more frequency domain spurs to estimate an instantaneous complex amplitude of each of the one or more frequency domain spurs. In some implementations, the wireless communication device 305 may perform spur estimation and correction for each of the one or more spurs identified by the wireless communication device 310.

Providing the wireless communication device 305 with the expected power and the baseband frequency of the one or more frequency domain spurs in the transmission signal spectrum of the wireless communication device 310 may enable the wireless communication device 305 to correct the one or more spurs more effectively (for example, using LMMSE), which can improve the quality and reliability of wireless communications between the wireless communication device 305 and the wireless communication device 310. Furthermore, using LMMSE to estimate and correct spurs may enable the wireless communication device 305 to attain a higher SNR (relative to using LS estimation) and use modulation schemes with relatively high SNR constraints (such as 4K QAM or 16K QAM).

Figure 4:
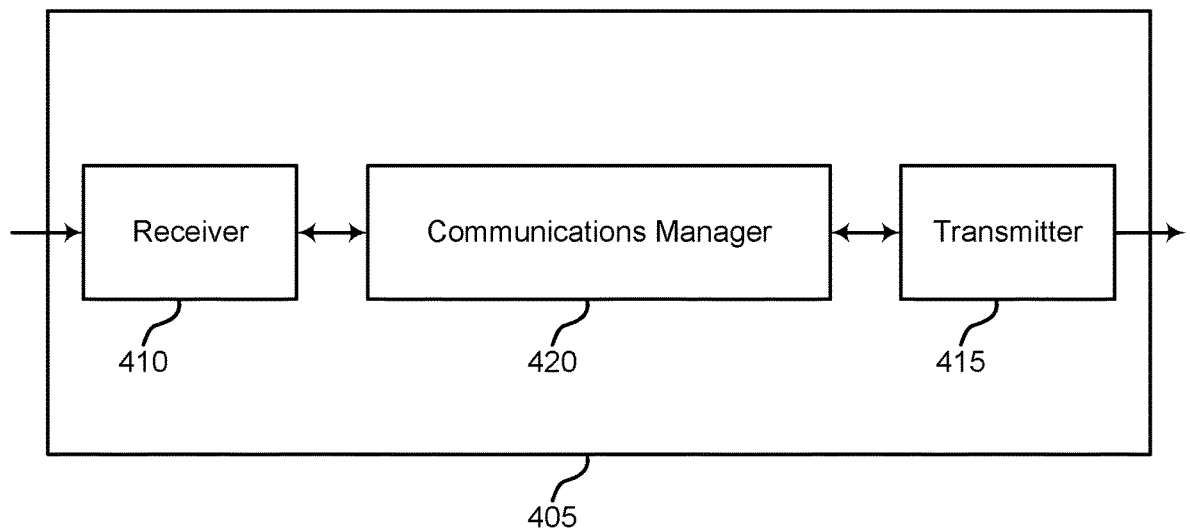
FIGS. 4 and 5 show block diagrams of example wireless communication devices that support measurement information for spur estimation and correction according to some implementations.

FIG. 4 shows a block diagram of an example wireless communication device 405 that supports measurement information for spur estimation and correction according to some implementations. The wireless communication device 405 may include a receiver 410, a transmitter 415, and a communications manager 420. The wireless communication device 405, or one or more components of the wireless communication device 405 (for example, the receiver 410, the transmitter 415, and the communications manager 420), may include at least one processor, which may be coupled with at least one memory, to, individually or collectively, support or enable the described techniques. Each of these components may be in communication with one another (for example, via one or more buses).

The receiver 410 may provide a means for receiving information such as packets, user data, or control information associated with various information channels (for example, control channels, data channels, information channels related to measurement information for spur estimation and correction). Information may be passed on to other components of the wireless communication device 405. The receiver 410 may utilize a single antenna or a set of multiple antennas.

The transmitter 415 may provide a means for transmitting signals generated by other components of the wireless communication device 405. For example, the transmitter 415 may transmit information such as packets, user data, or control information associated with various information channels (for example, control channels, data channels, information channels related to measurement information for spur estimation and correction). In some implementations, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of measurement information for spur estimation and correction. For example, the communications manager 420, the receiver 410, the transmitter 415, or various combinations or components thereof may be capable of performing one or more of the functions described herein.

In some implementations, the communications manager 420 may be configured to perform various operations (for example, receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations.

The communications manager 420 may support wireless communication at the wireless communication device 405. For example, the communications manager 420 may be capable of, configured to, or operable to support a means for receiving spur measurement information associated with one or more frequency domain spurs in a transmission signal spectrum of a second wireless communication device, the spur measurement information indicating a baseband frequency and an expected power of each of the one or more frequency domain spurs. The communications manager 420 may be further capable of, configured to, or operable to support a means for receiving one or more signals, in which receiving the one or more signals includes processing the one or more signals in accordance with the spur measurement information to compensate the one or more signals for the one or more frequency domain spurs in the transmission signal spectrum of the second wireless communication device.

Figure 5:
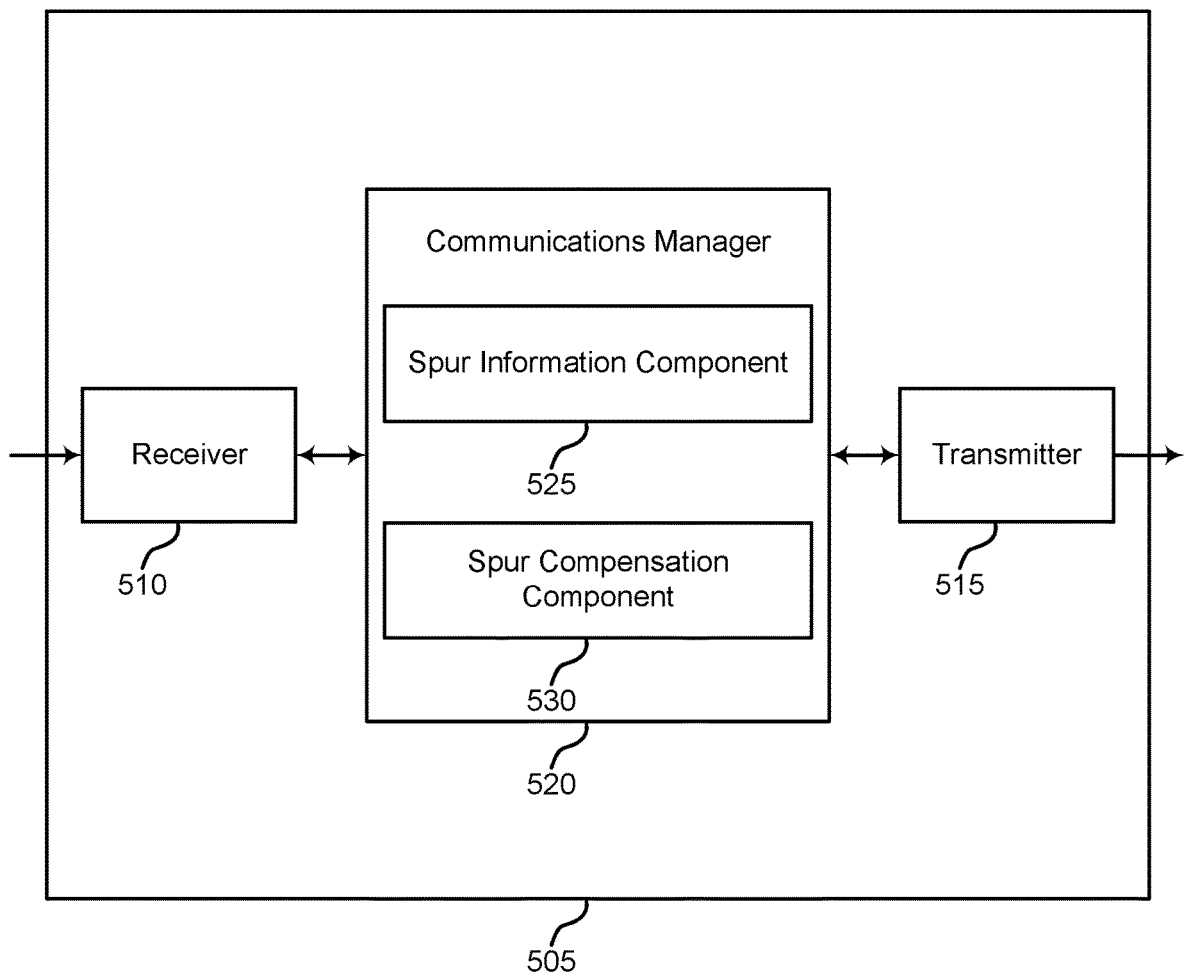

FIG. 5 shows a block diagram of a wireless communication device 505 that supports measurement information for spur estimation and correction according to some implementations. The wireless communication device 505 may include a receiver 510, a transmitter 515, and a communications manager 520. The wireless communication device 505, or one of more components of the wireless communication device 505 (for example, the receiver 510, the transmitter 515, and the communications manager 520), may include at least one processor, which may be coupled with at least one memory, to support the described techniques. Each of these components may be in communication with one another (for example, via one or more buses).

The receiver 510 may provide a means for receiving information such as packets, user data, or control information associated with various information channels (for example, control channels, data channels, information channels related to measurement information for spur estimation and correction). Information may be passed on to other components of the wireless communication device 505. The receiver 510 may utilize a single antenna or a set of multiple antennas.

The transmitter 515 may provide a means for transmitting signals generated by other components of the wireless communication device 505. For example, the transmitter 515 may transmit information such as packets, user data, or control information associated with various information channels (for example, control channels, data channels, information channels related to measurement information for spur estimation and correction). In some implementations, the transmitter 515 may be co-located with a receiver 510 in a transceiver component. The transmitter 515 may utilize a single antenna or a set of multiple antennas.

The wireless communication device 505, or various components thereof, may be an example of means for performing various aspects of measurement information for spur estimation and correction. In some implementations, the communications manager 520, or various components thereof, may be configured to perform various operations (for example, receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations.

The communications manager 520 may support wireless communication at the wireless communication device 505. The spur information component 525 may be capable of, configured to, or operable to support a means for receiving spur measurement information associated with one or more frequency domain spurs in a transmission signal spectrum of a second wireless communication device, the spur measurement information indicating a baseband frequency and an expected power of each of the one or more frequency domain spurs. The spur compensation component 530 may be capable of, configured to, or operable to support a means for receiving one or more signals, in which receiving the one or more signals includes processing the one or more signals in accordance with the spur measurement information to compensate the one or more signals for the one or more frequency domain spurs in the transmission signal spectrum of the second wireless communication device.

Figure 6:
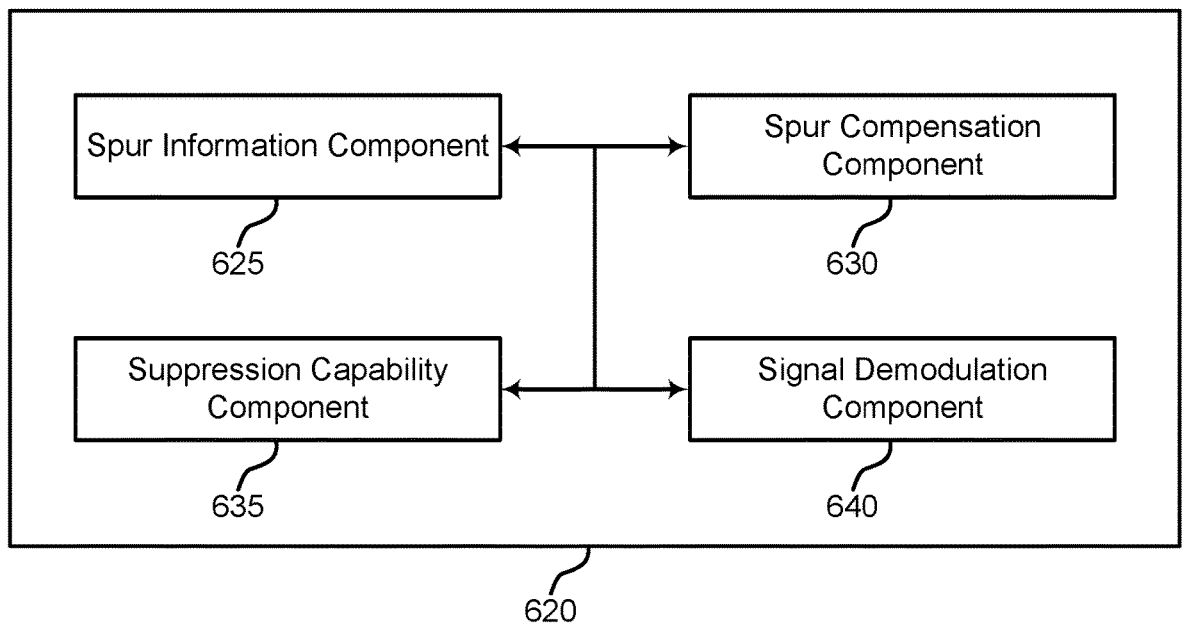
FIG. 6 shows a block diagram of an example communications manager that supports measurement information for spur estimation and correction according to some implementations.

FIG. 6 shows a block diagram of an example communications manager 620 that supports measurement information for spur estimation and correction according to some implementations. The communications manager 620, or various components thereof, may be an example of means for performing various aspects of measurement information for spur estimation and correction. For example, the communications manager 620 may include a spur information component 625, a spur compensation component 630, a suppression capability component 635, and a signal demodulation component 640. Each of these components or subcomponents thereof (for example, one or more processors, one or more memories), may communicate, directly or indirectly, with one another (for example, via one or more buses). The communications manager 620 can be implemented, at least in part, by one or more of a modem and a processor.

The communications manager 620 may support wireless communication at a first wireless communication device (such as the wireless communication device 305 shown and described with reference to FIG. 3). The spur information component 625 may be capable of, configured to, or operable to support a means for receiving spur measurement information associated with one or more frequency domain spurs in a transmission signal spectrum of a second wireless communication device, the spur measurement information indicating a baseband frequency and an expected power of each of the one or more frequency domain spurs. The spur compensation component 630 may be capable of, configured to, or operable to support a means for receiving one or more signals, in which receiving the one or more signals includes processing the one or more signals in accordance with the spur measurement information to compensate the one or more signals for the one or more frequency domain spurs in the transmission signal spectrum of the second wireless communication device.

In some implementations, the suppression capability component 635 may be capable of, configured to, or operable to support a means for transmitting spur suppression capability information indicating a capability of the first wireless communication device to estimate and correct frequency domain spurs, in which the spur measurement information associated with the second wireless communication device is provided in accordance with the spur suppression capability information associated with the first wireless communication device.

In some implementations, to process the one or more signals, the spur compensation component 630 may be further capable of, configured to, or operable to support a means for using an LMMSE estimator to compensate the one or more signals for the one or more frequency domain spurs in the transmission signal spectrum of the second wireless communication device. In some implementations, the baseband frequency and the expected power of the one or more frequency domain spurs are inputs to the LMMSE estimator.

In some implementations, to process the one or more signals, the spur compensation component 630 may be further capable of, configured to, or operable to support a means for estimating and correcting each of the one or more frequency domain spurs in accordance with the spur measurement information.

In some implementations, estimating each of the one or more frequency domain spurs includes using the baseband frequency and the expected power of each of the one or more frequency domain spurs to estimate an instantaneous complex amplitude of each of the one or more frequency domain spurs.

In some implementations, the expected power of each of the one or more frequency domain spurs includes an average power level of each of the one or more frequency domain spurs.

In some implementations, the first wireless communication device includes a UE, and the second wireless communication device includes a network entity. In some other implementations, the first wireless communication device includes a network entity, and the second wireless communication device includes a UE.

Figure 7:
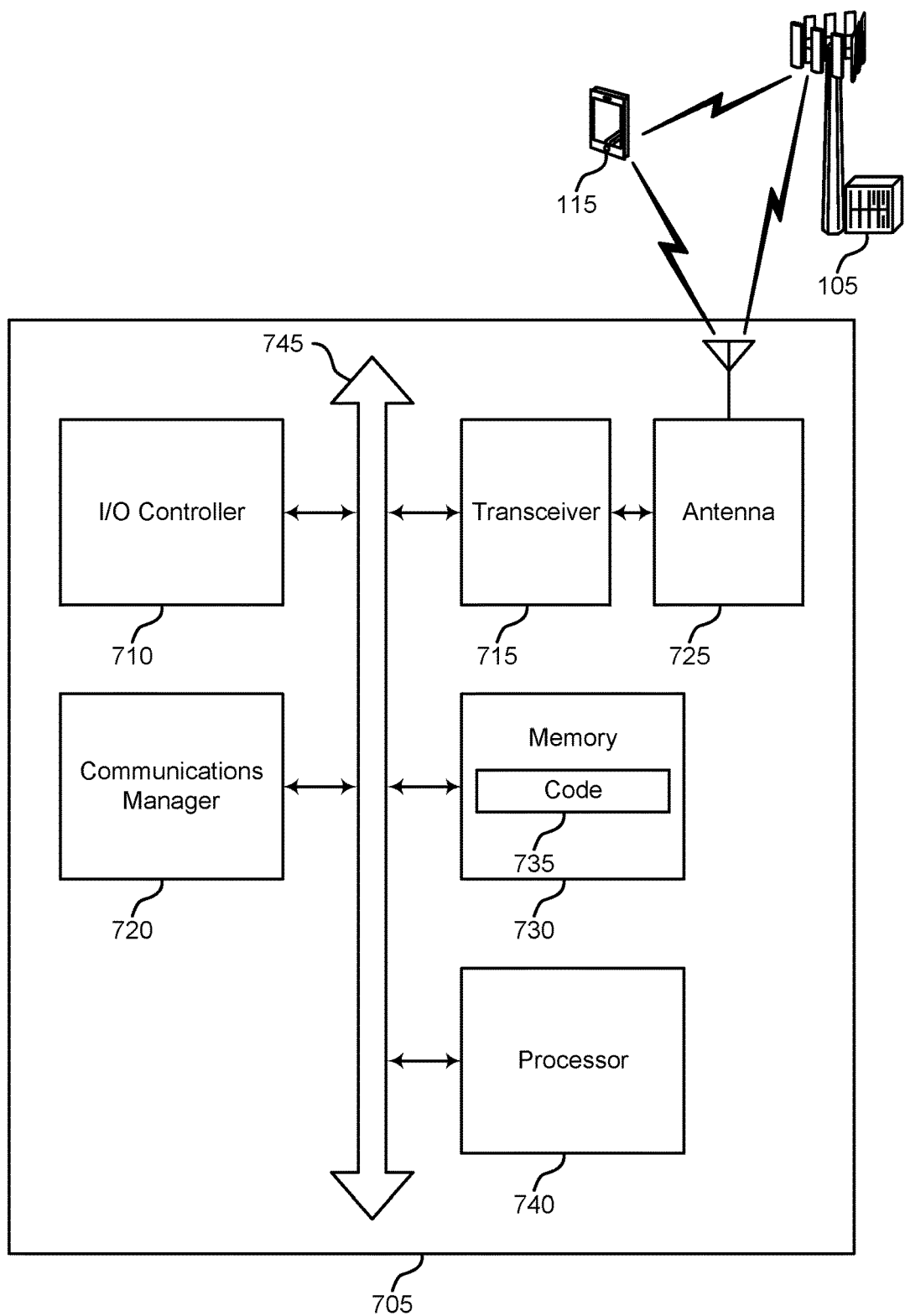
FIG. 7 shows a diagram of an example system including a wireless communication device that supports measurement information for spur estimation and correction according to some implementations.

FIG. 7 shows a diagram of an example system including a wireless communication device 705 that supports measurement information for spur estimation and correction. The wireless communication device 705 may be an example of or include components of the wireless communication device 305, the wireless communication device 405, or the wireless communication device 505, as shown and described with reference to FIG. 3-5, respectively. The wireless communication device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (for example, operatively, communicatively, functionally, electronically, electrically) via one or more buses (for example, a bus 745).

The I/O controller 710 may manage input and output signals for the wireless communication device 705. The I/O controller 710 may also manage peripherals not integrated into the wireless communication device 705. In some implementations, the I/O controller 710 may represent a physical connection or port to an external peripheral. In some implementations, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some implementations, the I/O controller 710 may be implemented as part of one or more processors, such as the at least one processor 740. In some implementations, a user may interact with the wireless communication device 705 via the I/O controller 710 or via hardware components controlled by the I/O controller 710.

In some implementations, the wireless communication device 705 may include a single antenna 725. However, in some other cases, the wireless communication device 705 may have more than one antenna 725, which may be capable of concurrently transmitting or receiving multiple wireless transmissions. The transceiver 715 may communicate bi-directionally, via the one or more antennas 725, wired, or wireless links. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, or a receiver 510.

The at least one memory 730 may include random-access memory (RAM) and read-only memory (ROM). The at least one memory 730 may store computer-readable, computer-executable code 735 including instructions that, when executed by the at least one processor 740, cause the wireless communication device 705 to perform various functions described herein. The code 735 may be stored in a non-transitory computer-readable medium such as system memory or another type of memory. In some implementations, the code 735 may not be directly executable by the at least one processor 740 but may cause a computer (for example, when compiled and executed) to perform functions described herein. In some implementations, the at least one memory 730 may contain, among other things, a basic I/O system (BIOS) which may control basic hardware or software operation such as the interaction with peripheral components or devices.

The at least one processor 740 may include at least one of an intelligent hardware device (for example, a general-purpose processor, a DSP, a CPU, a microcontroller, an ASIC, an FPGA, a programmable logic device, a discrete gate or transistor logic component, and/or a discrete hardware component). In some implementations, the at least one processor 740 may be configured to operate a memory array using a memory controller. In some other cases, a memory controller may be integrated into the at least one processor 740. The at least one processor 740 may be configured to execute computer-readable instructions stored in a memory (for example, the at least one memory 730) to cause the wireless communication device 705 to perform various functions (for example, functions or tasks supporting measurement information for spur estimation and correction). For example, the wireless communication device 705 or a component of the wireless communication device 705 may include at least one processor 740 and at least one memory 730 coupled with or to the at least one processor 740, the at least one processor 740 and at least one memory 730 configured to perform various functions described herein. In some implementations, the at least one processor 740 may include multiple processors and the at least one memory 730 may include multiple memories. One or more of the multiple processors may be coupled with one or more of the multiple memories, which may, individually or collectively, be configured to perform various functions herein.

The communications manager 720 may support wireless communication at the wireless communication device 705. For example, the communications manager 720 may be capable of, configured to, or operable to support a means for receiving spur measurement information associated with one or more frequency domain spurs in a transmission signal spectrum of a second wireless communication device, the spur measurement information indicating a baseband frequency and an expected power of each of the one or more frequency domain spurs. The communications manager 720 may be capable of, configured to, or operable to support a means for receiving one or more signals, in which receiving the one or more signals includes processing the one or more signals in accordance with the spur measurement information to compensate the one or more signals for the one or more frequency domain spurs in the transmission signal spectrum of the second wireless communication device.

In some implementations, the communications manager 720 may be configured to perform various operations (for example, receiving, monitoring, transmitting) using or otherwise in cooperation with the transceiver 715 and/or the one or more antennas 725. Although the communications manager 720 is illustrated as a separate component, In some implementations, one or more functions described with reference to the communications manager 720 may be supported by or performed by the at least one processor 740, the at least one memory 730, and/or the code 735. For example, the code 735 may include instructions executable by the at least one processor 740 to cause the wireless communication device 705 to perform various aspects of measurement information for spur estimation and correction, or the at least one processor 740 and the at least one memory 730 may be otherwise configured to, individually or collectively, perform or support such operations.

Figure 8:
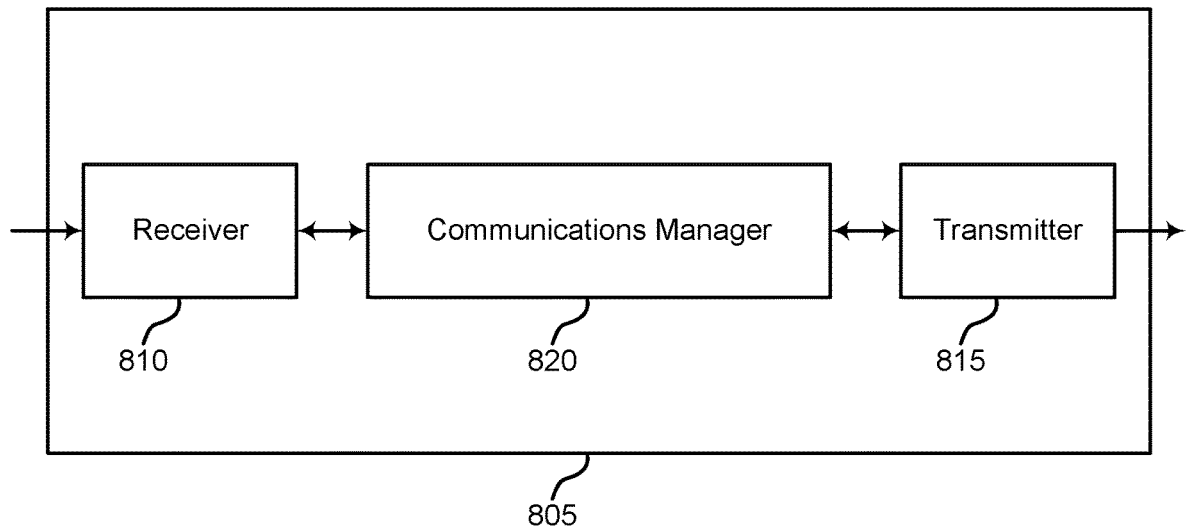
FIGS. 8 and 9 show block diagrams of example wireless communication devices that support measurement information for spur estimation and correction according to some implementations.

FIG. 8 shows a block diagram of an example wireless communication device 805 that supports measurement information for spur estimation and correction. The wireless communication device 805 may be an example of aspects of any suitable wireless communication device including, for example, the wireless communication device 310 described above with reference to FIG. 3. The wireless communication device 805 may include a receiver 810, a transmitter 815, and a communications manager 820. The wireless communication device 805, or one or more components of the wireless communication device 805 (for example, the receiver 810, the transmitter 815, and the communications manager 820), may include at least one processor, which may be coupled with at least one memory, to, individually or collectively, support or enable the described techniques. Each of these components may be in communication with one another (for example, via one or more buses).

The receiver 810 may provide a means for obtaining (for example, receiving, determining, identifying) information such as user data or control information (for example, I/Q samples, symbols, packets, protocol data units, service data units) associated with various channels (for example, control channels, data channels, information channels, channels associated with a protocol stack). Information may be passed on to other components of the wireless communication device 805. In some implementations, the receiver 810 may support obtaining information by receiving signals via one or more antennas. Additionally, or alternatively, the receiver 810 may support obtaining information by receiving signals via one or more wired (for example, electrical, fiber optic) or wireless interfaces.

The transmitter 815 may provide a means for outputting (for example, transmitting, providing, conveying, sending) information generated by other components of the wireless communication device 805. For example, the transmitter 815 may output information such as user data or control information (for example, I/Q samples, symbols, packets, protocol data units, service data units) associated with various channels (for example, control channels, data channels, information channels, channels associated with a protocol stack). In some implementations, the transmitter 815 may support outputting information by transmitting signals via one or more antennas. Additionally, or alternatively, the transmitter 815 may support outputting information by transmitting signals via one or more wired (for example, electrical, fiber optic) or wireless interfaces. In some implementations, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of measurement information for spur estimation and correction. For example, the communications manager 820, the receiver 810, the transmitter 815, or various combinations or components thereof may be capable of performing one or more of the functions described herein.

In some implementations, the communications manager 820 may be configured to perform various operations (for example, receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations.

The communications manager 820 may support wireless communication at the wireless communication device 805. For example, the communications manager 820 may be capable of, configured to, or operable to support a means for receiving spur suppression capability information associated with a first wireless communication device, the spur suppression capability information indicating a capability of a first wireless device to estimate and correct frequency domain spurs. The communications manager 820 may be further capable of, configured to, or operable to support a means for transmitting, in accordance with the spur suppression capability information, spur measurement information associated with one or more frequency domain spurs in a transmission signal spectrum of the wireless communication device 805, the spur measurement information indicating a baseband frequency and an expected power of each of the one or more frequency domain spurs.

Figure 9:
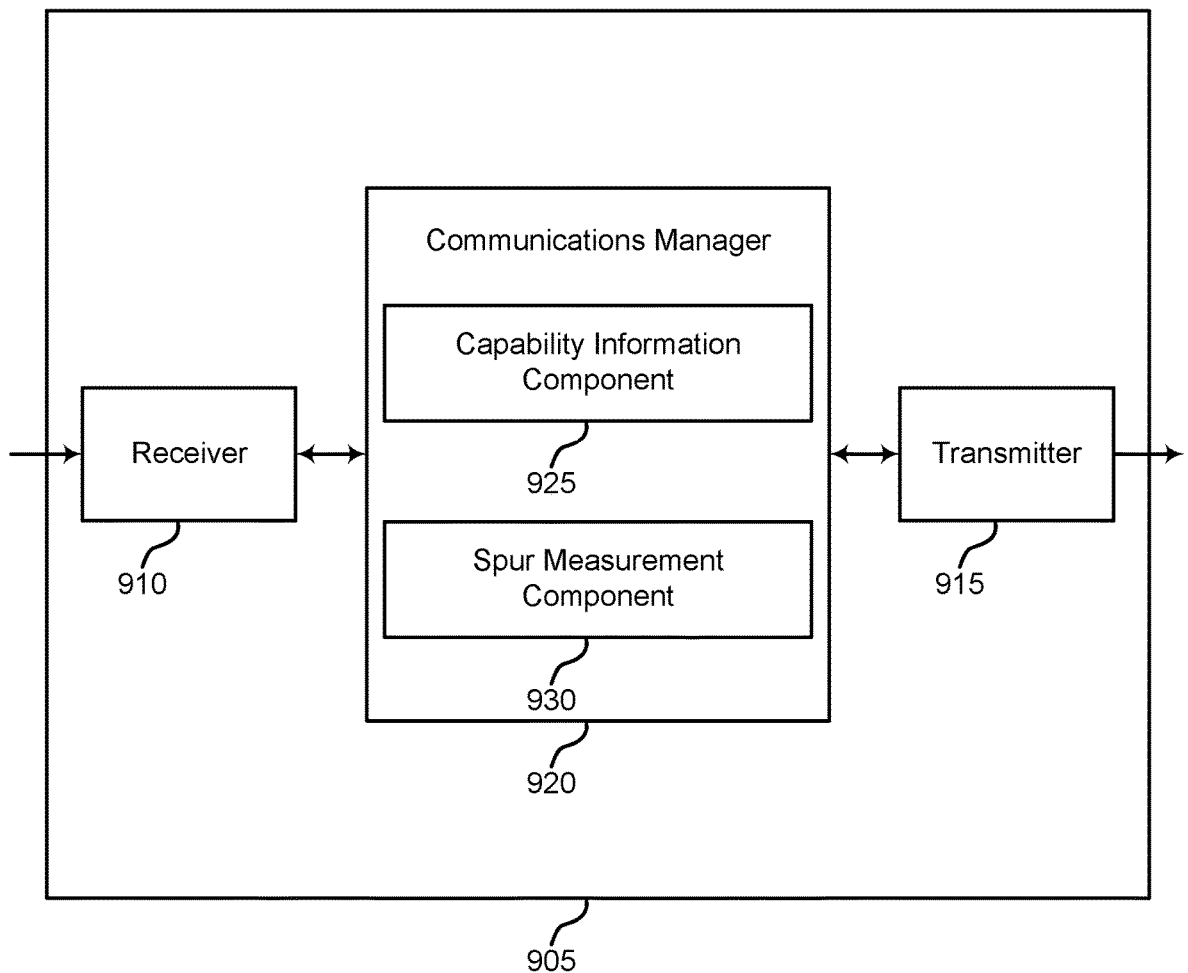

FIG. 9 shows a block diagram of an example wireless communication device 905 that supports measurement information for spur estimation and correction. The wireless communication device 905 may be an example of aspects of any suitable wireless communication device including, for example, the wireless communication device 310 and the wireless communication device 805 described above with reference to FIGS. 3 and 8, respectively. The wireless communication device 905 may include a receiver 910, a transmitter 915, and a communications manager 920. The wireless communication device 905, or one of more components of the wireless communication device 905 (for example, the receiver 910, the transmitter 915, and the communications manager 920), may include at least one processor, which may be coupled with at least one memory, to support the described techniques. Each of these components may be in communication with one another (for example, via one or more buses).

The receiver 910 may provide a means for obtaining (for example, receiving, determining, identifying) information such as user data and/or control information (for example, I/Q samples, symbols, packets, protocol data units, service data units) associated with various channels (for example, control channels, data channels, information channels, channels associated with a protocol stack). Information may be passed on to other components of the wireless communication device 905. In some implementations, the receiver 910 may support obtaining information by receiving signals via one or more antennas. Additionally, or alternatively, the receiver 910 may support obtaining information by receiving signals via one or more wired (for example, electrical, fiber optic) or wireless interfaces.

The transmitter 915 may provide a means for outputting (for example, transmitting, providing, conveying, sending) information generated by other components of the wireless communication device 905. For example, the transmitter 915 may output information such as user data and/or control information (for example, I/Q samples, symbols, packets, protocol data units, service data units) associated with various channels (for example, control channels, data channels, information channels, channels associated with a protocol stack). In some implementations, the transmitter 915 may support outputting information by transmitting signals via one or more antennas. Additionally, or alternatively, the transmitter 915 may support outputting information by transmitting signals via one or more wired (for example, electrical, fiber optic) or wireless interfaces. In some implementations, the transmitter 915 and the receiver 910 may be co-located in a transceiver, which may include or be coupled with a modem.

The wireless communication device 905, or various components thereof, may be an example of means for performing spur estimation and correction according to some implementations. For example, the communications manager 920 may include a capability information component 925, a spur measurement component 930, or both. In some implementations, the communications manager 920, or various components thereof, may be configured to perform various operations (for example, receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations.

The communications manager 920 may support wireless communication at the wireless communication device 905. The capability information component 925 may be capable of, configured to, or operable to support a means for receiving spur suppression capability information associated with a first wireless communication device, the spur suppression capability information indicating a capability of a first wireless device to estimate and correct frequency domain spurs. The spur measurement component 930 may be capable of, configured to, or operable to support a means for transmitting, in accordance with the spur suppression capability information, spur measurement information associated with one or more frequency domain spurs in a transmission signal spectrum of the wireless communication device 905, the spur measurement information indicating a baseband frequency and an expected power of each of the one or more frequency domain spurs.

Figure 10:
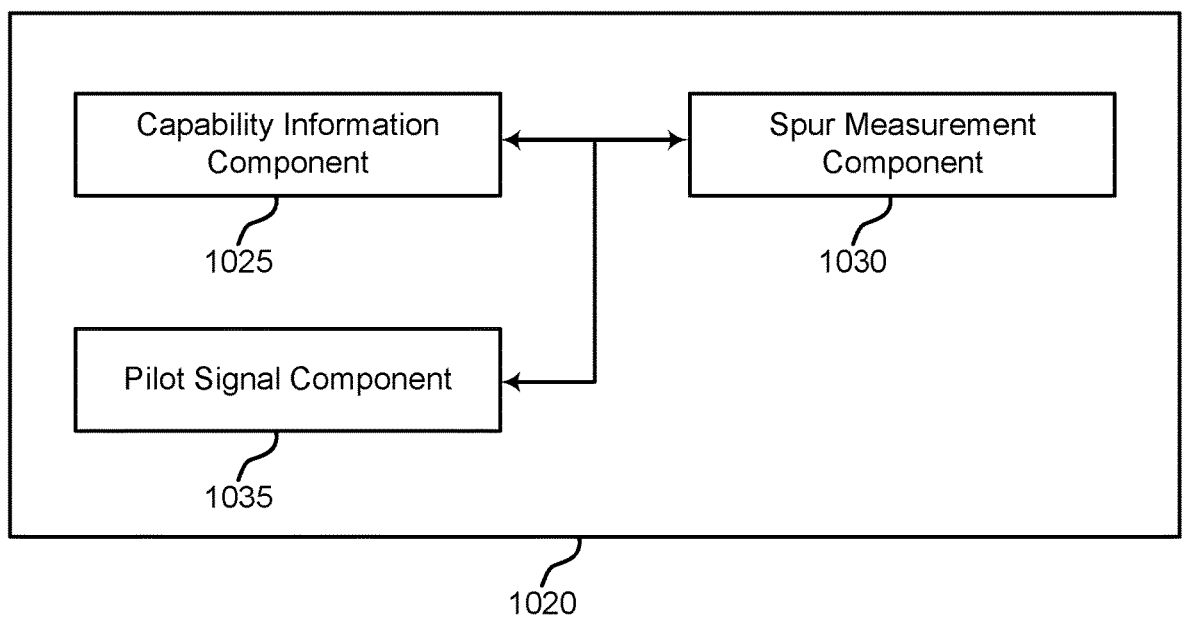
FIG. 10 shows a block diagram of an example communications manager that supports measurement information for spur estimation and correction.

FIG. 10 shows a block diagram of an example communications manager 1020 that supports measurement information for spur estimation and correction according to some implementations. The communications manager 1020, or various components thereof, may be capable of, configured to, or otherwise support a means for performing aspects of the spur estimation and correction techniques described herein. For example, the communications manager 1020 may include a capability information component 1025, a spur measurement component 1030, and a pilot signal component 1035. Each of these components, or subcomponents thereof (for example, one or more processors, one or more memories), may communicate, directly or indirectly, with one another (for example, via one or more buses). The communications manager 1020 can be implemented, at least in part, by one or more of a modem and a processor.

The communications manager 1020 may support wireless communication at a second wireless communication device (such as the wireless communication device 310 shown and described with reference to FIG. 3). The capability information component 1025 may be capable of, configured to, or operable to support a means for receiving spur suppression capability information associated with a first wireless communication device, the spur suppression capability information indicating a capability of a first wireless device to estimate and correct frequency domain spurs. The spur measurement component 1030 may be capable of, configured to, or operable to support a means for transmitting, in accordance with the spur suppression capability information, spur measurement information associated with one or more frequency domain spurs in a transmission signal spectrum of the second wireless communication device, the spur measurement information indicating a baseband frequency and an expected power of each of the one or more frequency domain spurs.

The pilot signal component 1035 may be capable of, configured to, or operable to support a means for transmitting, in accordance with the spur measurement information, one or more signals using an MCS that includes one or more of a 256 QAM scheme, a 1K QAM scheme, a 4K QAM scheme, or a 16K QAM scheme.

In some implementations, the expected power of each of the one or more frequency domain spurs includes an average power level of each of the one or more frequency domain spurs.

In some implementations, the first wireless communication device includes a network entity and the second wireless communication device includes a UE. In some other implementations, the first wireless communication device includes a UE and the second wireless communication device includes a network entity.

Figure 11:
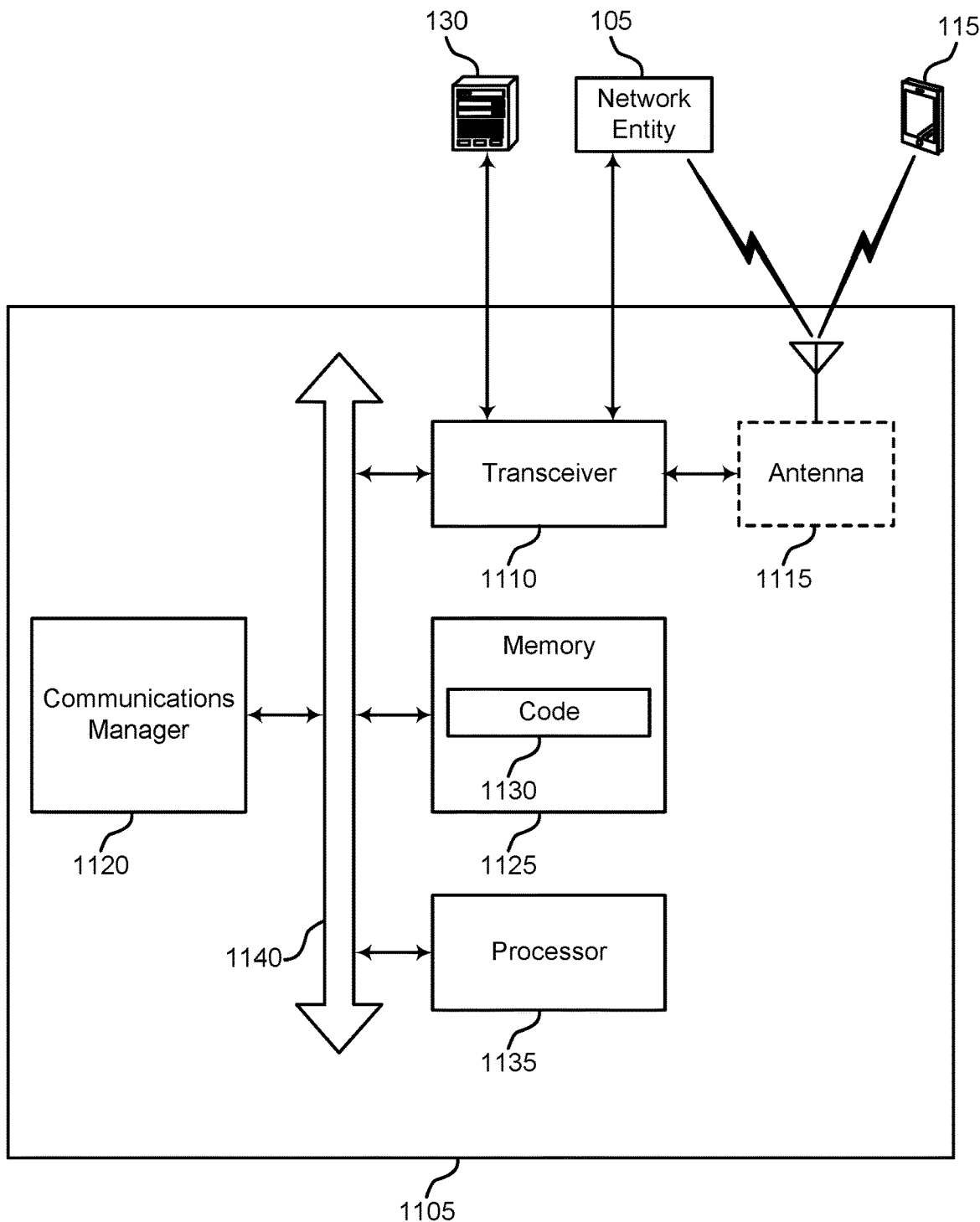
FIG. 11 shows a diagram of an example system including a wireless communication device that supports measurement information for spur estimation and correction according to some implementations.

FIG. 11 shows a diagram of an example system including a wireless communication device 1105 that supports measurement information for spur estimation and correction. The wireless communication device 1105 may be any suitable wireless communication device including, for example, the wireless communication device 310, the wireless communication device 805, and the wireless communication device 905 described above with reference to FIGS. 3, 8 and 9, respectively. The wireless communication device 1105 may include components for bi-directional voice and data communications including components for transmitting and receiving communications, such as a communications manager 1120, a transceiver 1110, an antenna 1115, at least one memory 1125, code 1130, and at least one processor 1135. These components may be in electronic communication or otherwise coupled (for example, operatively, communicatively, functionally, electronically, electrically) via one or more buses (for example, a bus 1140).

The transceiver 1110 may support bi-directional communications via wired links, wireless links, or both. In some implementations, the transceiver 1110 may include a wired transceiver and may communicate bi-directionally with another wired transceiver. Additionally, or alternatively, in some implementations, the transceiver 1110 may include a wireless transceiver and may communicate bi-directionally with another wireless transceiver. In some implementations, the wireless communication device 1105 may include one or more antennas 1115, which may be capable of transmitting or receiving wireless transmissions (for example, concurrently). The transceiver 1110 may also include a modem to modulate signals, to provide the modulated signals for transmission (for example, by one or more antennas 1115, by a wired transmitter), to receive modulated signals (for example, from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations.

In some implementations, the transceiver 1110 may include or be configured for coupling with one or more processors or one or more memory components that are operable to perform or support operations associated with received or obtained information or signals, or to generate information or other signals for transmission or other outputting. In some implementations, the transceiver 1110, or the transceiver 1110 and the one or more antennas 1115, or the transceiver 1110 and the one or more antennas 1115 and one or more processors or one or more memory components (for example, the at least one processor 1135, the at least one memory 1125, or both), may be included in a chip or chip assembly that is installed in the wireless communication device 1105. In some implementations, the transceiver 1110 may be operable to support communications via one or more communications links (for example, a communication link 125, a backhaul communication link 120, a midhaul communication link 162, a fronthaul communication link 168).

The at least one memory 1125 may include RAM and/or ROM. The at least one memory 1125 may store computer-readable, computer-executable code 1130 including instructions that, when executed by one or more of the at least one processor 1135, cause the wireless communication device 1105 to perform various functions described herein. The code 1130 may be stored in a non-transitory computer-readable medium such as system memory or another type of memory. In some implementations, the code 1130 may not be directly executable by a processor of the at least one processor 1135 but may cause a computer (for example, when compiled and executed) to perform functions described herein. In some implementations, the at least one memory 1125 may contain, among other things, a BIOS which may control basic hardware or software operation such as the interaction with peripheral components or devices. In some implementations, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (for example, a general-purpose processor, a DSP, an ASIC, a CPU, an FPGA, a microcontroller, a programmable logic device, discrete gate or transistor logic, and/or a discrete hardware component). In some implementations, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (for example, one or more of the at least one memory 1125) to cause the wireless communication device 1105 to perform various functions (for example, functions or tasks supporting measurement information for spur estimation and correction). For example, the wireless communication device 1105 or a component of the wireless communication device 1105 may include at least one processor 1135 and at least one memory 1125 coupled with one or more of the at least one processor 1135, the at least one processor 1135 and the at least one memory 1125 configured to perform various functions described herein.

The at least one processor 1135 may be an example of a cloud-computing platform (for example, one or more physical nodes and supporting software such as operating systems, virtual machines, or container instances) that may host the functions (for example, by executing code 1130) to perform the functions of the wireless communication device 1105. The at least one processor 1135 may be any one or more suitable processors capable of executing scripts or instructions of one or more software programs stored in the wireless communication device 1105 (such as within one or more of the at least one memory 1125).

In some implementations, the at least one processor 1135 may be a component of a processing system. A processing system may generally refer to a system or series of machines or components that receives inputs and processes the inputs to produce a set of outputs (which may be passed to other systems or components of, for example, the wireless communication device 1105). For example, a processing system of the wireless communication device 1105 may refer to a system including the various other components or subcomponents of the wireless communication device 1105, such as the at least one processor 1135, or the transceiver 1110, or the communications manager 1120, or other components or combinations of components of the wireless communication device 1105. The processing system of the wireless communication device 1105 may interface with other components of the wireless communication device 1105, and may process information received from other components (such as inputs or signals) or output information to other components. For example, a chip or modem of the wireless communication device 1105 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the wireless communication device 1105 may transmit information output from the chip or modem. Additionally, or alternatively, in some implementations, the one or more interfaces may refer to an interface between the processing system of the chip or modem and a receiver, such that the wireless communication device 1105 may obtain information or signal inputs, and the information may be passed to the processing system. A person having ordinary skill in the art will readily recognize that a first interface also may obtain information or signal inputs, and a second interface also may output information or signal outputs.

In some implementations, a bus 1140 may support communications of (for example, within) a protocol layer of a protocol stack. In some implementations, a bus 1140 may support communications associated with a logical channel of a protocol stack (for example, between protocol layers of a protocol stack), which may include communications performed within a component of the wireless communication device 1105, or between different components of the wireless communication device 1105 that may be co-located or located in different locations (for example, in which the wireless communication device 1105 may refer to a system in which one or more of the communications manager 1120, the transceiver 1110, the at least one memory 1125, the code 1130, and the at least one processor 1135 may be located in one of the different components or divided between different components).

In some implementations, the communications manager 1120 may manage aspects of communications with a core network 130 (for example, via one or more wired or wireless backhaul links). For example, the communications manager 1120 may manage the transfer of data communications for client devices, such as one or more UEs 115. In some implementations, the communications manager 1120 may manage communications with other network entities 105, and may include a controller or scheduler for controlling communications with UEs 115 in cooperation with other network entities 105. In some implementations, the communications manager 1120 may support an X2 interface within an LTE/LTE-A wireless communications network technology to provide communication between network entities 105.

The communications manager 1120 may support wireless communication at the wireless communication device 1105. For example, the communications manager 1120 may be capable of, configured to, or operable to support a means for receiving spur suppression capability information associated with a first wireless communication device, the spur suppression capability information indicating a capability of a first wireless device to estimate and correct frequency domain spurs. The communications manager 1120 may be further capable of, configured to, or operable to support a means for transmitting, in accordance with the spur suppression capability information, spur measurement information associated with one or more frequency domain spurs in a transmission signal spectrum of the wireless communication device 1105, the spur measurement information indicating a baseband frequency and an expected power of each of the one or more frequency domain spurs.

In some implementations, the communications manager 1120 may be configured to perform various operations (for example, receiving, obtaining, monitoring, outputting, transmitting) using or otherwise in cooperation with the transceiver 1110 and/or the one or more antennas 1115. Although the communications manager 1120 is illustrated as a separate component, In some implementations, one or more functions described with reference to the communications manager 1120 may be supported by or performed by the transceiver 1110, one or more of the at least one processor 1135, one or more of the at least one memory 1125 or the code 1130 (for example, by a processing system including at least a portion of the at least one processor 1135, the at least one memory 1125, and/or the code 1130). For example, the code 1130 may include instructions executable by one or more of the at least one processor 1135 to cause the wireless communication device 1105 to perform various aspects of measurement information for spur estimation and correction, or the at least one processor 1135 and the at least one memory 1125 may be otherwise configured to, individually or collectively, perform or support such operations.

Figure 12:
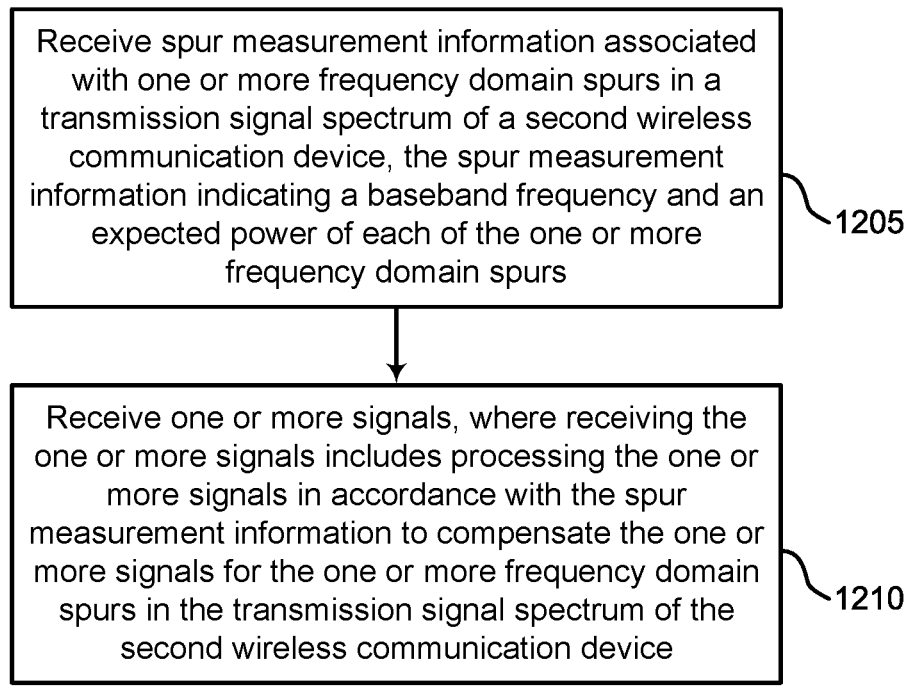
FIGS. 12 and 13 show flowcharts illustrating example processes for wireless communication that support measurement information for spur estimation and correction according to some implementations.

FIG. 12 shows a flowchart illustrating an example process performable by a first wireless communication device that supports measurement information for spur estimation and correction. The first wireless communication device may be any suitable wireless communication device including, for example, the wireless communication devices 305, 405, and 505 described above with reference to FIGS. 3-5, respectively. In some implementations, the first wireless communication device may execute a set of instructions to control the functional elements of the first wireless communication device to perform aspects of the described operations. Additionally, or alternatively, the first wireless communication device may perform aspects of the described functions using special-purpose hardware.

At 1205, the first wireless communication device may receive spur measurement information associated with one or more frequency domain spurs in a transmission signal spectrum of a second wireless communication device, the spur measurement information indicating a baseband frequency and an expected power of each of the one or more frequency domain spurs. In some implementations, aspects of the operations of 1205 may be performed by a spur information component 625, as described with reference to FIG. 6.

At 1210, the first wireless communication device may receive one or more signals, in which receiving the one or more signals includes processing the one or more signals in accordance with the spur measurement information to compensate the one or more signals for the one or more frequency domain spurs in the transmission signal spectrum of the second wireless communication device. In some implementations, aspects of the operations of 1210 may be performed by a spur compensation component 630, as described with reference to FIG. 6.

Figure 13:
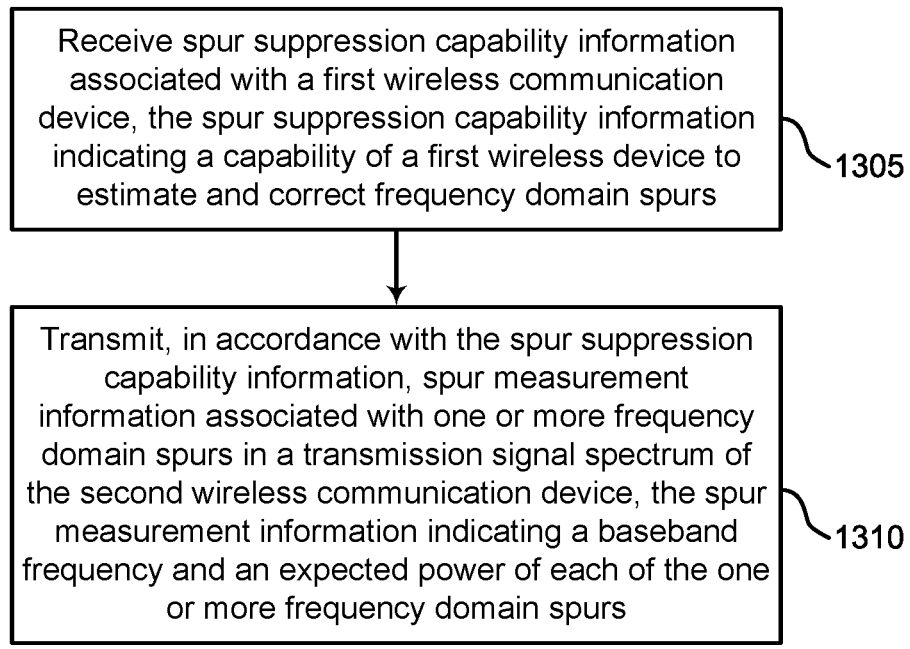

FIG. 13 shows a flowchart illustrating an example process performable by a second wireless communication device that supports measurement information for spur estimation and correction. The second wireless communication device may be any suitable wireless communication device including, for example, the wireless communication devices 310, 805, and 905 described above with reference to FIGS. 3, 8, and 9, respectively. In some implementations, the second wireless communication device may execute a set of instructions to control the functional elements of the second wireless communication device to perform the described functions. Additionally, or alternatively, the second wireless communication device may perform the described functions using special-purpose hardware.

At 1305, the second wireless communication device may receive spur suppression capability information associated with a first wireless communication device, the spur suppression capability information indicating a capability of a first wireless device to estimate and correct frequency domain spurs. In some implementations, aspects of the operations of 1305 may be performed by a capability information component 1025, as described with reference to FIG. 10.

At 1310, the second wireless communication device may transmit, in accordance with the spur suppression capability information, spur measurement information associated with one or more frequency domain spurs in a transmission signal spectrum of the second wireless communication device, the spur measurement information indicating a baseband frequency and an expected power of each of the one or more frequency domain spurs. In some implementations, aspects of the operations of 1310 may be performed by a spur measurement component 1030, as described with reference to FIG. 10.

Implementation examples are described in the following numbered clauses:

Clause 1: A first wireless communication device, including: a processing system that includes processor circuitry and memory circuitry that stores code, the processing system configured to cause the first wireless communication device to: receive spur measurement information associated with one or more frequency domain spurs in a transmission signal spectrum of a second wireless communication device, the spur measurement information indicating a baseband frequency and an expected power of each of the one or more frequency domain spurs; and receive one or more signals, where receiving the one or more signals includes processing the one or more signals in accordance with the spur measurement information to compensate the one or more signals for the one or more frequency domain spurs in the transmission signal spectrum of the second wireless communication device.

Clause 2: The first wireless communication device of clause 1, where the processing system is further configured to cause the first wireless communication device to transmit spur suppression capability information indicating a capability of the first wireless communication device to estimate and correct frequency domain spurs, the spur measurement information associated with the second wireless communication device is provided in accordance with the spur suppression capability information associated with the first wireless communication device.

Clause 3: The first wireless communication device of any one or more of clauses 1-2, where to process the one or more signals, the processing system is configured to cause the first wireless communication device to use an LMMSE estimator to compensate the one or more signals for the one or more frequency domain spurs in the transmission signal spectrum of the second wireless communication device.

Clause 4: The first wireless communication device of clause 3, where the baseband frequency and the expected power of the one or more frequency domain spurs are inputs to the LMMSE estimator.

Clause 5: The first wireless communication device of any one or more of clauses 1-4, where to process the one or more signals, the processing system is configured to cause the first wireless communication device to estimate and correct each of the one or more frequency domain spurs in accordance with the spur measurement information.

Clause 6: The first wireless communication device of clause 5, where to estimate each of the one or more frequency domain spurs, the processing system is configured to cause the first wireless communication device to use the baseband frequency and the expected power of each of the one or more frequency domain spurs to estimate an instantaneous complex amplitude of each of the one or more frequency domain spurs.

Clause 7: The first wireless communication device of any one or more of clauses 1-6, where the processing system is further configured to cause the first wireless communication device to demodulate the one or more signals using an MCS that includes one or more of a 256 QAM scheme, a 1K QAM scheme, a 4K QAM scheme, or a 16K QAM scheme.

Clause 8: The first wireless communication device of any one or more of clauses 1-7, where the expected power of each of the one or more frequency domain spurs includes an average power level of each of the one or more frequency domain spurs.

Clause 9: The first wireless communication device of any one or more of clauses 1-8, where the first wireless communication device includes a UE and the second wireless communication device includes a network entity.

Clause 10: The first wireless communication device of any one or more of clauses 1-9, where the first wireless communication device includes a network entity and the second wireless communication device includes a UE.

Clause 11: A second wireless communication device, including: a processing system that includes processor circuitry and memory circuitry that stores code, the processing system configured to cause the second wireless communication device to: receive spur suppression capability information associated with a first wireless communication device, the spur suppression capability information indicating a capability of a first wireless device to estimate and correct frequency domain spurs; and transmit, in accordance with the spur suppression capability information, spur measurement information associated with one or more frequency domain spurs in a transmission signal spectrum of the second wireless communication device, the spur measurement information indicating a baseband frequency and an expected power of each of the one or more frequency domain spurs.

Clause 12: The second wireless communication device of clause 11, where the processing system is further configured to cause the second wireless communication device to transmit, in accordance with the spur measurement information, one or more signals using an MCS that includes one or more of a 256 QAM scheme, a 1K QAM scheme, a 4K QAM scheme, or a 16K QAM scheme.

Clause 13: The second wireless communication device of any one or more of clauses 11-12, where the expected power of each of the one or more frequency domain spurs includes an average power level of each of the one or more frequency domain spurs.

Clause 14: The second wireless communication device of any one or more of clauses 11-13, where the first wireless communication device includes a network entity and the second wireless communication device includes a UE.

Clause 15: The second wireless communication device of any one or more of clauses 11-14, where the first wireless communication device includes a UE and the second wireless communication device includes a network entity.

Clause 16: A method for wireless communication by a first wireless communication device, including: receiving spur measurement information associated with one or more frequency domain spurs in a transmission signal spectrum of a second wireless communication device, the spur measurement information indicating a baseband frequency and an expected power of each of the one or more frequency domain spurs; and receiving one or more signals, where receiving the one or more signals includes processing the one or more signals in accordance with the spur measurement information to compensate the one or more signals for the one or more frequency domain spurs in the transmission signal spectrum of the second wireless communication device.

Clause 17: The method of clause 16, further including transmitting spur suppression capability information indicating a capability of the first wireless communication device to estimate and correct frequency domain spurs, where the spur measurement information associated with the second wireless communication device is provided in accordance with the spur suppression capability information associated with the first wireless communication device.

Clause 18: The method of any one or more of clauses 16-17, where processing the one or more signals includes using an LMMSE estimator to compensate the one or more signals for the one or more frequency domain spurs in the transmission signal spectrum of the second wireless communication device.

Clause 19: The method of clause 18, where the baseband frequency and the expected power of the one or more frequency domain spurs are inputs to the LMMSE estimator.

Clause 20: The method of any one or more of clauses 16-19, where processing the one or more signals includes estimating and correcting each of the one or more frequency domain spurs in accordance with the spur measurement information.

Clause 21: The method of clause 20, where estimating each of the one or more frequency domain spurs includes using the baseband frequency and the expected power of each of the one or more frequency domain spurs to estimate an instantaneous complex amplitude of each of the one or more frequency domain spurs.

Clause 22: The method of any one or more of clauses 16-21, further including demodulating the one or more signals using an MCS that includes one or more of a 256 QAM scheme, a 1K QAM scheme, a 4K QAM scheme, or a 16K QAM scheme.

Clause 23: The method of any one or more of clauses 16-22, where the expected power of each of the one or more frequency domain spurs includes an average power level of each of the one or more frequency domain spurs.

Clause 24: The method of any one or more of clauses 16-23, where the first wireless communication device includes a UE and the second wireless communication device includes a network entity.

Clause 25: The method of any one or more of clauses 16-24, where the first wireless communication device includes a network entity and the second wireless communication device includes a UE.

Clause 26: A method for wireless communication by a second wireless communication device, including: receiving spur suppression capability information associated with a first wireless communication device, the spur suppression capability information indicating a capability of a first wireless device to estimate and correct frequency domain spurs; and transmitting, in accordance with the spur suppression capability information, spur measurement information associated with one or more frequency domain spurs in a transmission signal spectrum of the second wireless communication device, the spur measurement information indicating a baseband frequency and an expected power of each of the one or more frequency domain spurs.

Clause 27: The method of clause 26, further including transmitting, in accordance with the spur measurement information, one or more signals using an MCS that includes one or more of a 256 QAM scheme, a 1K QAM scheme, a 4K QAM scheme, or a 16K QAM scheme.

Clause 28: The method of any one or more of clauses 26-27, where the expected power of each of the one or more frequency domain spurs includes an average power level of each of the one or more frequency domain spurs.

Clause 29: The method of any one or more of clauses 26-28, where the first wireless communication device includes a network entity and the second wireless communication device includes a UE.

Clause 30: The method of any one or more of clauses 26-29, where the first wireless communication device includes a UE and the second wireless communication device includes a network entity.

The methods described herein describe possible implementations, and that the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, and/or optical fields or particles.

The various illustrative blocks and components described in connection with the disclosure herein may be implemented or performed using a general-purpose processor, a DSP, an ASIC, a CPU, an FPGA or other programmable logic device, discrete gate or transistor logic, and/or discrete hardware components designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For examples in which the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (for example, A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. The terms "a," "at least one," "one or more," "at least one of one or more" may be interchangeable. For example, if a claim recites "a component" that performs one or more functions, each of the individual functions may be performed by a single component or by any combination of multiple components. The term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions, and "determining" can include calculating, computing, processing, deriving, investigating, looking up (such as via looking up in a table, a database or another data structure), or ascertaining. Also, "determining" can include receiving (for example, receiving information) or accessing (for example, accessing data stored in memory). Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. When the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A first wireless communication device, comprising:
a processing system that includes processor circuitry and memory circuitry that stores code, the processing system configured to cause the first wireless communication device to:
receive spur measurement information associated with one or more frequency domain spurs in a transmission signal spectrum of a second wireless communication device, the spur measurement information indicating a baseband frequency and an expected power of each of the one or more frequency domain spurs; and
receive one or more signals, wherein receiving the one or more signals includes processing the one or more signals in accordance with the spur measurement information to compensate the one or more signals for the one or more frequency domain spurs in the transmission signal spectrum of the second wireless communication device.

2. The first wireless communication device of claim 1, wherein the processing system is further configured to cause the first wireless communication device to:
transmit spur suppression capability information indicating a capability of the first wireless communication device to estimate and correct frequency domain spurs, wherein the spur measurement information associated with the second wireless communication device is provided in accordance with the spur suppression capability information associated with the first wireless communication device.

3. The first wireless communication device of claim 1, wherein to process the one or more signals, the processing system is configured to cause the first wireless communication device to use a linear minimum mean-square error (LMMSE) estimator to compensate the one or more signals for the one or more frequency domain spurs in the transmission signal spectrum of the second wireless communication device.

4. The first wireless communication device of claim 3, wherein the baseband frequency and the expected power of the one or more frequency domain spurs are inputs to the LMMSE estimator.

5. The first wireless communication device of claim 1, wherein to process the one or more signals, the processing system is configured to cause the first wireless communication device to estimate and correct each of the one or more frequency domain spurs in accordance with the spur measurement information.

6. The first wireless communication device of claim 5, wherein to estimate each of the one or more frequency domain spurs, the processing system is configured to cause the first wireless communication device to use the baseband frequency and the expected power of each of the one or more frequency domain spurs to estimate an instantaneous complex amplitude of each of the one or more frequency domain spurs.

7. The first wireless communication device of claim 1, wherein the processing system is further configured to cause the first wireless communication device to demodulate the one or more signals using a modulation and coding scheme (MCS) that includes one or more of a 256 quadrature amplitude modulation (QAM) scheme, a 1K QAM scheme, a 4K QAM scheme, or a 16K QAM scheme.

8. The first wireless communication device of claim 1, wherein the expected power of each of the one or more frequency domain spurs comprises an average power level of each of the one or more frequency domain spurs.

9. The first wireless communication device of claim 1, wherein the first wireless communication device comprises a user equipment (UE) and the second wireless communication device comprises a network entity.

10. The first wireless communication device of claim 1, wherein the first wireless communication device comprises a network entity and the second wireless communication device comprises a user equipment (UE).

11. A second wireless communication device, comprising:
a processing system that includes processor circuitry and memory circuitry that stores code, the processing system configured to cause the second wireless communication device to:
receive spur suppression capability information associated with a first wireless communication device, the spur suppression capability information indicating a capability of a first wireless device to estimate and correct frequency domain spurs; and
transmit, in accordance with the spur suppression capability information, spur measurement information associated with one or more frequency domain spurs in a transmission signal spectrum of the second wireless communication device, the spur measurement information indicating a baseband frequency and an expected power of each of the one or more frequency domain spurs.

12. The second wireless communication device of claim 11, wherein the processing system is further configured to cause the second wireless communication device to transmit, in accordance with the spur measurement information, one or more signals using a modulation and coding scheme (MCS) that includes one or more of a 256 quadrature amplitude modulation (QAM) scheme, a 1K QAM scheme, a 4K QAM scheme, or a 16K QAM scheme.

13. The second wireless communication device of claim 11, wherein the expected power of each of the one or more frequency domain spurs comprises an average power level of each of the one or more frequency domain spurs.

14. The second wireless communication device of claim 11, wherein the first wireless communication device comprises a network entity and the second wireless communication device comprises a user equipment (UE).

15. The second wireless communication device of claim 11, wherein the first wireless communication device comprises a user equipment (UE) and the second wireless communication device comprises a network entity.

16. A method for wireless communication by a first wireless communication device, comprising:
receiving spur measurement information associated with one or more frequency domain spurs in a transmission signal spectrum of a second wireless communication device, the spur measurement information indicating a baseband frequency and an expected power of each of the one or more frequency domain spurs; and
receiving one or more signals, wherein receiving the one or more signals includes processing the one or more signals in accordance with the spur measurement information to compensate the one or more signals for the one or more frequency domain spurs in the transmission signal spectrum of the second wireless communication device.

17. The method of claim 16, further comprising:
transmitting spur suppression capability information indicating a capability of the first wireless communication device to estimate and correct frequency domain spurs, wherein the spur measurement information associated with the second wireless communication device is provided in accordance with the spur suppression capability information associated with the first wireless communication device.

18. The method of claim 16, wherein processing the one or more signals comprises using a linear minimum mean-square error (LMMSE) estimator to compensate the one or more signals for the one or more frequency domain spurs in the transmission signal spectrum of the second wireless communication device.

19. The method of claim 18, wherein the baseband frequency and the expected power of the one or more frequency domain spurs are inputs to the LMMSE estimator.

20. The method of claim 16, wherein processing the one or more signals comprises estimating and correcting each of the one or more frequency domain spurs in accordance with the spur measurement information.

21. The method of claim 20, wherein estimating each of the one or more frequency domain spurs comprises using the baseband frequency and the expected power of each of the one or more frequency domain spurs to estimate an instantaneous complex amplitude of each of the one or more frequency domain spurs.

22. The method of claim 16, further comprising demodulating the one or more signals using a modulation and coding scheme (MCS) that includes one or more of a 256 quadrature amplitude modulation (QAM) scheme, a 1K QAM scheme, a 4K QAM scheme, or a 16K QAM scheme.

23. The method of claim 16, wherein the expected power of each of the one or more frequency domain spurs comprises an average power level of each of the one or more frequency domain spurs.

24. The method of claim 16, wherein the first wireless communication device comprises a user equipment (UE) and the second wireless communication device comprises a network entity.

25. The method of claim 16, wherein the first wireless communication device comprises a network entity and the second wireless communication device comprises a user equipment (UE).

26. A method for wireless communication by a second wireless communication device, comprising:
receiving spur suppression capability information associated with a first wireless communication device, the spur suppression capability information indicating a capability of a first wireless device to estimate and correct frequency domain spurs; and
transmitting, in accordance with the spur suppression capability information, spur measurement information associated with one or more frequency domain spurs in a transmission signal spectrum of the second wireless communication device, the spur measurement information indicating a baseband frequency and an expected power of each of the one or more frequency domain spurs.

27. The method of claim 26, further comprising transmitting, in accordance with the spur measurement information, one or more signals using a modulation and coding scheme (MCS) that includes one or more of a 256 quadrature amplitude modulation (QAM) scheme, a 1K QAM scheme, a 4K QAM scheme, or a 16K QAM scheme.

28. The method of claim 26, wherein the expected power of each of the one or more frequency domain spurs comprises an average power level of each of the one or more frequency domain spurs.

29. The method of claim 26, wherein the first wireless communication device comprises a network entity and the second wireless communication device comprises a user equipment (UE).

30. The method of claim 26, wherein the first wireless communication device comprises a user equipment (UE) and the second wireless communication device comprises a network entity.

* * * * *